United States Patent
Nakashima

(10) Patent No.: US 10,363,903 B2
(45) Date of Patent: Jul. 30, 2019

(54) VEHICLE KEYLESS SYSTEM AND ON-VEHICLE DEVICE OF VEHICLE KEYLESS SYSTEM

(71) Applicant: Calsonic Kansei Corporation, Saitama (JP)

(72) Inventor: Yuuki Nakashima, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 16/069,055

(22) PCT Filed: Mar. 3, 2017

(86) PCT No.: PCT/JP2017/008454
§ 371 (c)(1),
(2) Date: Jul. 10, 2018

(87) PCT Pub. No.: WO2017/159400
PCT Pub. Date: Sep. 21, 2017

(65) Prior Publication Data
US 2019/0031142 A1    Jan. 31, 2019

(30) Foreign Application Priority Data

Mar. 18, 2016 (JP) ................................. 2016-054678

(51) Int. Cl.
*B60R 25/24* (2013.01)
*H04B 1/3822* (2015.01)
*E05B 81/54* (2014.01)

(52) U.S. Cl.
CPC ........... *B60R 25/24* (2013.01); *H04B 1/3822* (2013.01); *E05B 81/54* (2013.01)

(58) Field of Classification Search
CPC ....... B60R 25/24; B60R 25/01; B60R 25/241; E05B 81/54; H04B 1/3822; H04B 5/0031;
(Continued)

(56) References Cited

U.S. PATENT DOCUMENTS 9,544,853 B1 *   1/2017  Gu .................... H04W 52/0261
2002/0173289 A1 * 11/2002 Pacsai ..................... B60R 25/24
                                                        455/343.1

(Continued)

FOREIGN PATENT DOCUMENTS

GB    2432026 A  *  5/2007  ............. B60R 25/24
JP    2005-120662      5/2005
(Continued)

OTHER PUBLICATIONS

International Search Report issued in International Application No. PCT/JP2017/005484 dated May 23, 2017 (3 pages).
(Continued)

*Primary Examiner* — Yong Hang Jiang
(74) *Attorney, Agent, or Firm* — Hamre, Schumann, Mueller & Larson, P.C.

(57) ABSTRACT

In a vehicle keyless system 1, an on-vehicle device 10 receives a command signal transmitted from a portable device 2 and controls a predetermined on-vehicle component. The portable device 2 transmits, as a main signal MS, a command signal including ID information unique to the portable device 2, and then transmits a sub signal LP subsequent to the main signal MS. The on-vehicle device 10 transitions to a sleep state when the command signal transmitted as the main signal MS is received and the ID information included in the received main signal MS does not match with ID information stored in an EEPROM 14 as
(Continued)

ID information unique to the portable device 2 to which the on-vehicle device 10 is available.

16 Claims, 15 Drawing Sheets

(58) Field of Classification Search
CPC ...... H04Q 9/00; G07C 2209/08; G07C 5/008; G07C 9/00182; G07C 9/00309; H04W 4/80; H04W 52/0229; H04W 52/0241; H04W 52/0261
USPC .................................. 340/5.1, 5.2, 5.6, 5.64
See application file for complete search history.

(56) References Cited

U.S. PATENT DOCUMENTS

2006/0091996 A1* 5/2006 Conner .................. B60C 23/04
340/5.64
2009/0224869 A1* 9/2009 Baker .................... G07C 5/008
340/5.1
2017/0349144 A1* 12/2017 Furuta .................... B60R 25/24

FOREIGN PATENT DOCUMENTS

| JP | 2009-127244 | 6/2009 |
| JP | 2010-222810 | 10/2010 |

OTHER PUBLICATIONS

Written Opinion issued in International Application No. PCT/JP2017/005484 dated May 23, 2017 (4 pages).

International Preliminary Report on Patentability issued in International Application No. PCT/JP2017/005484 dated Apr. 24, 2018. Partial English translation. (12 pages).

* cited by examiner

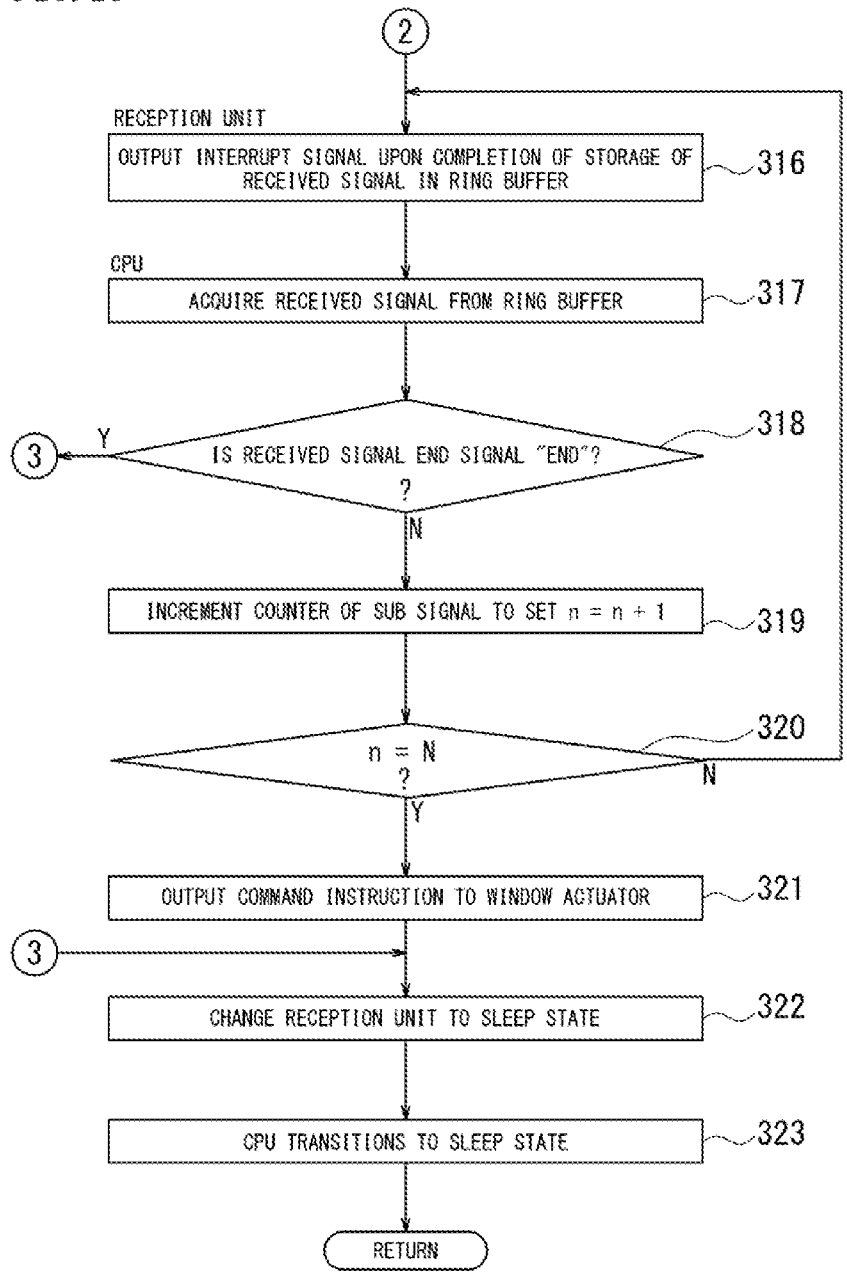

VEHICLE KEYLESS SYSTEM AND ON-VEHICLE DEVICE OF VEHICLE KEYLESS SYSTEM

TECHNICAL FIELD

The present invention relates to a vehicle keyless system in which wireless communication is performed between a portable device operated by a person and an on-vehicle device mounted on a vehicle so that a predetermined on-vehicle component is controlled, and also relates to the on-vehicle device of the vehicle keyless system.

BACKGROUND ART

Recently, vehicle keyless systems have been widely used and various proposals for improving the convenience of such systems have been made.

In some vehicle keyless systems, different command signals are transmitted from a portable device depending on an operational mode of a key button.

For example, when the key button is normally operated, a command signal instructing vehicle door locking or unlocking is transmitted as a main signal, while when the key button is pressed for a long time (operated in a special mode), a command signal instructing door window opening or closing is transmitted as a sub signal.

Patent Literature 1 discloses a vehicle keyless system in which, when a key button of a portable device is pressed for a long time, the portable device performs RF transmission of a command signal, and an on-vehicle device having received the transmitted command signal performs LF transmission of a reply signal.

CITATION LIST

Patent Literature

Patent Literature 1: Japanese Patent Laid-open No. 2010-222810

In the vehicle keyless system disclosed in Patent Literature 1, while long press on the key button continues, the portable device repeats RF transmission of a command signal at a predetermined interval upon each reception of a reply signal transmitted from the on-vehicle device. Then, when the number of times that the on-vehicle device receives the RF-transmitted command signal reaches a predetermined number, an operation on an on-vehicle component which is specified by the command signal is performed.

Thus, when the key button is operated while the portable device is located at a position distant from a vehicle, the portable device cannot receive the LF-transmitted reply signal from the on-vehicle device. Accordingly, when the key button is pressed for a long time, no RF signal is repeatedly transmitted from the portable device, which leads to reduction of power consumption at the portable device.

However, the on-vehicle device needs to stand by in a state that the on-vehicle device can always receive RF transmission, and thus it has been difficult to reduce power consumption at the on-vehicle device.

Furthermore, in another vehicle keyless system, an on-vehicle device provided to include a reception unit configured to receive a command signal transmitted from a portable device, an actuator configured to drive an on-vehicle component as a control target specified by the command signal, and a control unit configured to control the reception unit and the actuator.

In this on-vehicle device, the reception unit outputs an interrupt signal to the control unit at each reception of a command signal. Then, having received the interrupt signal from the reception unit, the control unit acquires the command signal received by the reception unit, and performs code analysis to extract, for example, ID information and command information included in the command signal.

Then, the control unit performs matching of the extracted ID information. When the received command signal is directed to the own vehicle on which the on-vehicle device is mounted, the control unit outputs, to the actuator as a control target, a command for actuating the control target based on the command information and the like extracted from the command signal.

SUMMARY OF INVENTION

Technical Problem

The reception unit outputs an interrupt signal to the control unit even when the command signal received by the reception unit is transmitted from a portable device for any other vehicle (portable device associated with an on-vehicle device of any other vehicle). Thus, the control unit performs the above-described code analysis upon each reception of the interrupt signal.

Then, when it is determined based on a result of the code analysis that the command signal received by the reception unit is not directed to the own vehicle, any subsequent processing is interrupted.

With this configuration, each time the reception unit receives a command signal, the control unit performs a series of processing up to at least the code analysis in response to an interrupt signal irrespective of whether the received command signal is directed to the own vehicle. This leads to unnecessary electrical power consumption at the on-vehicle device.

Thus, it is desired that the on-vehicle device avoids unnecessary electrical power consumption when having received a command signal directed to any other vehicle.

Solution to Problem

A vehicle keyless system according to the present invention is a vehicle keyless system in which an on-vehicle device receives a command signal transmitted from a portable device and controls a predetermined on-vehicle component. The portable device is configured to transmit the command signal including ID information unique to the portable device as a main signal, and then transmits the command signal including the ID information unique to the portable device as a sub signal subsequent to the main signal, and the sub signal includes a plurality of identical signals intermittently transmitted. The on-vehicle device executes state in a case that the command signal transmitted as the main signal is received and the ID information included in the received main signal does not match with ID information stored in a storage unit as ID information that is unique to a portable device to which the on-vehicle device is available. In the state transition processing, the reception unit is transitioned to a sleep states in which the reception unit is intermittently activated at a timing that is different from a timing of the sub signal intermittently transmitted and the on-vehicle device is transitioned to a power saving state in which processing is not performed on the sub signal transmitted subsequent to the main signal.

Advantageous Effects of Invention

According to the present invention, when an on-vehicle device receives a command signal transmitted as a main signal and directed to any other vehicle, the on-vehicle device transitions to a power saving state at a timing of the reception of the main signal because ID information included in the received command signal is different from ID information stored in a storage unit.

Accordingly, no processing is performed on a sub signal transmitted subsequent to the main signal, and thus electric power consumption at the on-vehicle device is reduced, which avoids unnecessary electrical power consumption.

BRIEF DESCRIPTION OF DRAWINGS

FIG. 15 is a flowchart illustrating the process of the processing at the on-vehicle device according to the third example.

DESCRIPTION OF EMBODIMENT

In a vehicle keyless system, control of various kinds of on-vehicle components can be a command target.

The following description will be made on an example with a keyless entry system in which locking and unlocking of a door is a main command target.

Figure 1:
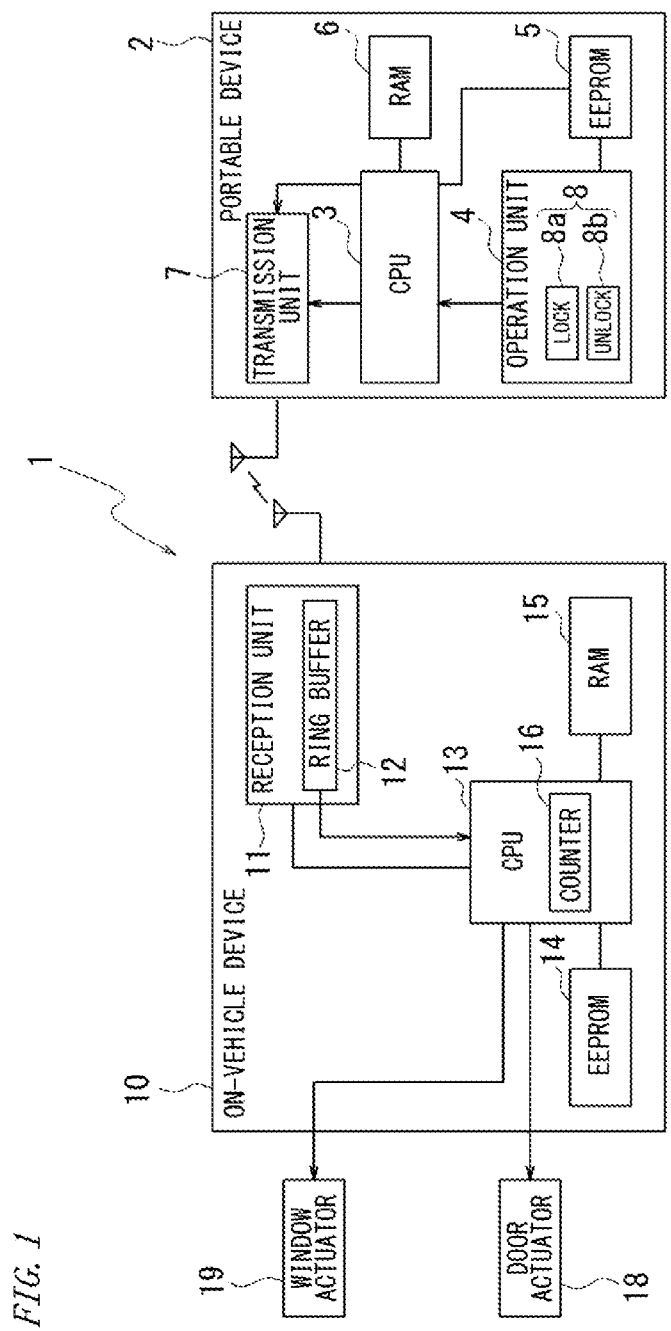
FIG. 1 is a block diagram illustrating the entire configuration of a keyless entry system.

FIG. 1 is a block diagram illustrating the entire configuration of a keyless entry system 1.

The keyless entry system 1 includes a portable device 2 that a person using a vehicle (hereinafter also referred to as a user) is carrying, and an on-vehicle device 10 mounted on the vehicle.

When having received a command signal from the portable device 2, the on-vehicle device 10 outputs a drive signal based on the received command signal to, for example, a door actuator 18 configured to lock and unlock any door of the vehicle, or to a window actuator 19 configured to open and close any door window.

The portable device 2 mainly includes a CPU 3 as a control unit, an operation unit 4, an EEPROM 5, a RAM 6, and a transmission unit 7.

The operation unit 4 includes a key button 8 operated by the user, and the key buttons 8 of the portable device 2 are a lock button 8a and an unlock button 8b. In the following description, for the convenience of description, the lock button 8a and the unlock button 8b are referred to as the key buttons 8 when not distinguished from each other.

The EEPROM 5 stores a processing program for executing operation of CPU 3, and ID (identification) information.

The CPU 3 performs processing of generating a command signal based on an operation on the key button 8, and outputs the generated command signal to the transmission unit 7.

The RAM 6 temporarily stores data and the like while processing is performed by the CPU 3.

The transmission unit 7 includes an oscillation circuit and a modulation circuit (not illustrated), and transmits, as radio wave, a command signal generated by the CPU 3.

The on-vehicle device 10 mainly includes a reception unit 11, a CPU 13 as a control unit, an EEPROM 14, and a RAM 15.

The reception unit 11 receives a command signal transmitted from the portable device 2. The reception unit 11 includes a ring buffer 12 as a memory configured to sequentially and temporarily store command signals, and stores data of the received command signal in the ring buffer 12. The sequentially stored data can be taken out from the ring buffer 12 allows in a time sequential, and the ring buffer 12 is capable of storing at least two unit command signals described later.

The CPU 13 includes a counter 16 to be described later.

The EEPROM 14 stores a processing program for operating the CPU 13, and ID information.

The RAM 15 temporarily stores data and the like while processing is performed by the CPU 13.

The CPU 13 acquires a command signal stored in the ring buffer 12 through acquisition communication in a SPI (serial peripheral interface) mode, and performs matching processing, command processing, or the like based on the command signal.

Then, the CPU 13 outputs a command instruction such as a drive signal to the door actuator 18 or the window actuator 19 based on the matching processing, the command processing, or the like.

The CPU 13 also performs an entire control of the on-vehicle device 10 including the reception unit 11.

Although not illustrated, the on-vehicle device 10 includes, between the CPU 13 and each of the door actuator 18 and the window actuator 19, an interface for transmitting the command instruction.

Next, an outline of operation of the keyless entry system 1 will be described with reference to FIG. 2.

Figure 2:
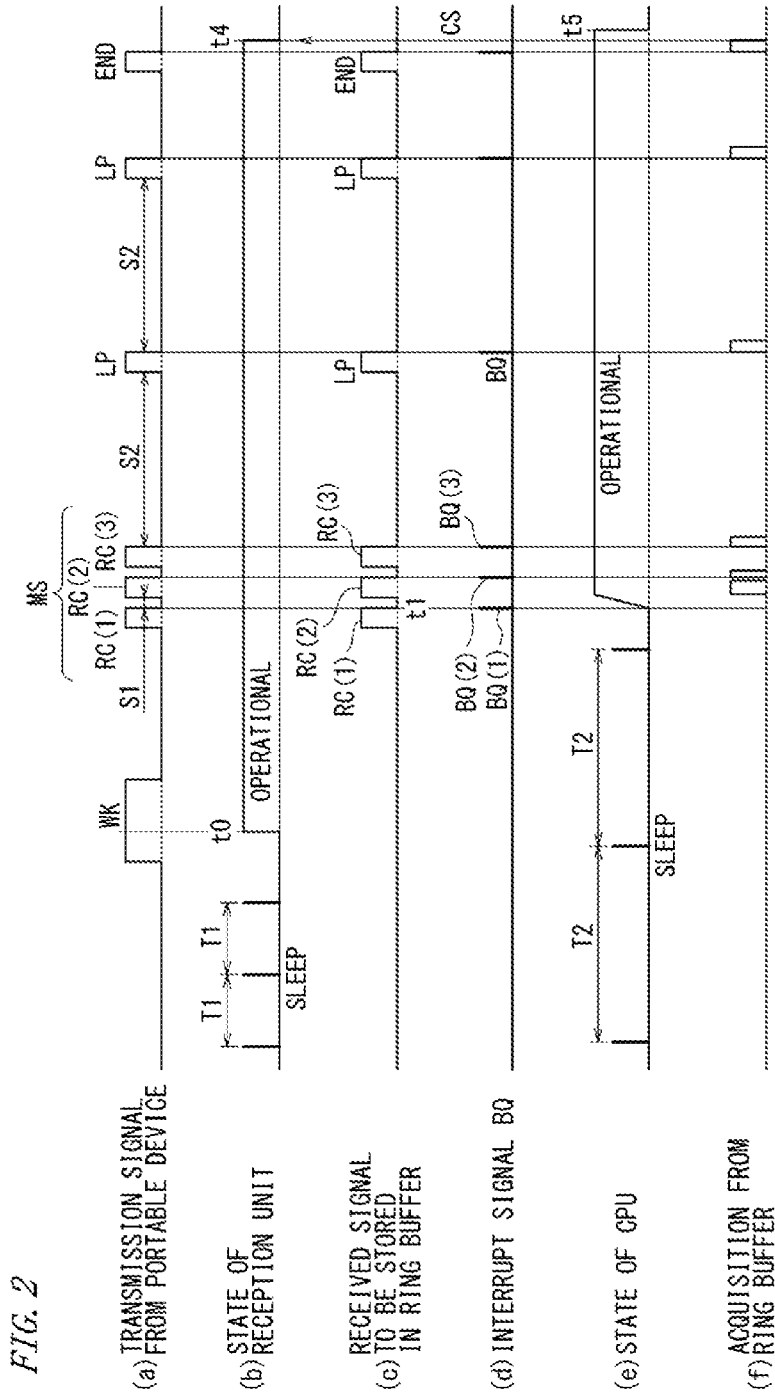
FIG. 2 is a time chart illustrating operation at an on-vehicle device.

When the user presses down the key button 8 of the portable device 2, signals illustrated in (a) of FIG. 2 is transmitted from the portable device 2 to the on-vehicle device 10.

The signals are a wake-up signal WK for activating the reception unit 11, a main signal MS (unit command signal RC) for the CPU 13 to execute command processing in response to the pressed key button 8, and an end signal END indicating completion of signal transmission, which are transmitted in a time sequential manner.

In an embodiment, operations of the key button 8 include an operation (first operation) of simply pressing down the key button 8 and a special operation (second operation) of pressing the key button 8 for a long time.

When the user presses down the key button 8 of the portable device 2 a long time (when the second operation is performed), the above-described signals further includes sub signals LP between the unit command signal RC and the end signal END, as illustrated in (a) of FIG. 2.

The unit command signal RC includes a plurality of unit command signals RC. In the embodiment, three unit command signals RC (RC(1), RC(2), and RC(3)) are transmitted at a predetermined time interval (first time interval S1) such as 5 ms.

The unit command signal RC includes ID information uniquely allocated to the portable device 2, and code data indicating a command information corresponding to the pressed key button 8 (the lock button 8*a* or the unlock button 8*b*). The unit command signals RC (RC(1), RC(2), and RC(3)) generated when the key button 8 is pressed have identical contents.

In the following description, the three unit command signals RC(1), RC(2), and RC(3) are also collectively referred to as the main signal MS.

The special operation (second operation) as described above will be explained.

For example, when the operation (first operation) of simply pressing down the unlock button 8*b* is performed, each unit command signal RC generated due to the first operation includes command information requesting door unlock.

When the special operation (second operation) of pressing the unlock button 8*b* for a long time is performed, each unit command signal RC generated due to the second operation includes, for example, command information for opening a door window.

In the embodiment, the on-vehicle device 10 needs to be capable of confirming that the unlock button 8*b* is pressed for a long time. Thus, while the key button 8 is continued to be pressed, a unit command signal (RC) identical to the main signal MS is transmitted as a sub signal after the main signal MS at a second time interval S2 that is longer than the first time interval S1.

In the following description, the unit command signal transmitted at the second time interval S2 is referred to as the sub signal LP and distinguished from the main signal MS.

When the operation of pressing down the key button 8 ends, the end signal END including the ID information is transmitted from the transmission unit 7.

It should be noted that a data length of the unit command signal RC is set in advance and stored in the EEPROM 14 of the on-vehicle device 10.

As illustrated in (a) and (b) of FIG. 2, the reception unit 11 of the on-vehicle device 10 is intermittently activated in a sleep state until reception of the wake-up signal WK from the portable device 2.

When having received the wake-up signal WK at an operation timing, the reception unit 11 transitions to an operational state from the sleep state, being capable of constantly receiving the main signal MS and the like that is transmitted from the portable device 2.

Thus, the wake-up signal WK has a length set to be larger than an intermittent interval T1 at the intermittent operation of the reception unit 11 ((a) and (b) of FIG. 2).

The intermittent interval T1 at the intermittent operation of the reception unit 11 has an operation timing set to be a value for avoiding overlapping with the sub signal LP.

The operation of the keyless entry system 1 will be described below in detail with examples.

EXAMPLE 1

FIG. 2 is a time chart of operation at the on-vehicle device 10 according to a first example. FIG. 2 illustrates, in (a), arrival signals from the portable device 2 (transmission signal from the portable device) to the reception unit 11. FIG. 2 illustrates, in (b), state transition of the reception unit 11. FIG. 2 illustrates, in (c), received signals that are stored in the ring buffer 12 by the reception unit 11. FIG. 2 illustrates, in (d), interrupt signals BQ output from the reception unit 11.

Note that FIG. 2 illustrates a state in which the end signal END is received after the two sub signals LP are received.

The reception unit 11 receives the wake-up signal WK illustrated in (a) of FIG. 2 and transitions to the operational state at time point t0 as illustrated in (b) of FIG. 2. Thereafter, the reception unit 11 sequentially stores data of received signals such as the unit command signal RC in the ring buffer 12 in a time sequential manner as illustrated in (c) of FIG. 2.

Then, at each time when the reception unit completes the storage of each received signal, the reception unit 11 outputs the interrupt signal BQ to the CPU 13 as illustrated in (d) of FIG. 2. This outputting of the interrupt signal BQ is similar both for the main signal MS and the sub signal LP.

FIG. 2 illustrates, in (e), state transition of the CPU 13.

Once the first unit command signal RC(1) of the main signal MS is stored in the ring buffer 12, the first interrupt signal BQ(1) (for the first time) is input to the CPU 13 at time point t1 when the storage is completed. Accordingly, the state of the CPU 13 transitions to the operational state from the sleep state of intermittent activation.

At each time when the CPU receives the interrupt signal BQ during the operational state, the CPU 13 acquires received signals stored in the ring buffer 12 of the reception unit 11 through acquisition communication.

FIG. 2 illustrates, in (f), acquisition communication timings, but the detail thereof as well as (e) of FIG. 2 will be described later with reference to FIG. 2 FIG. 3.

The CPU 13 stores the acquired received signal in the RAM 15, and the CPU 13 also performs code analysis on the received signal to extract ID information and command information and stores analysis results in the RAM 15.

Figure 3:
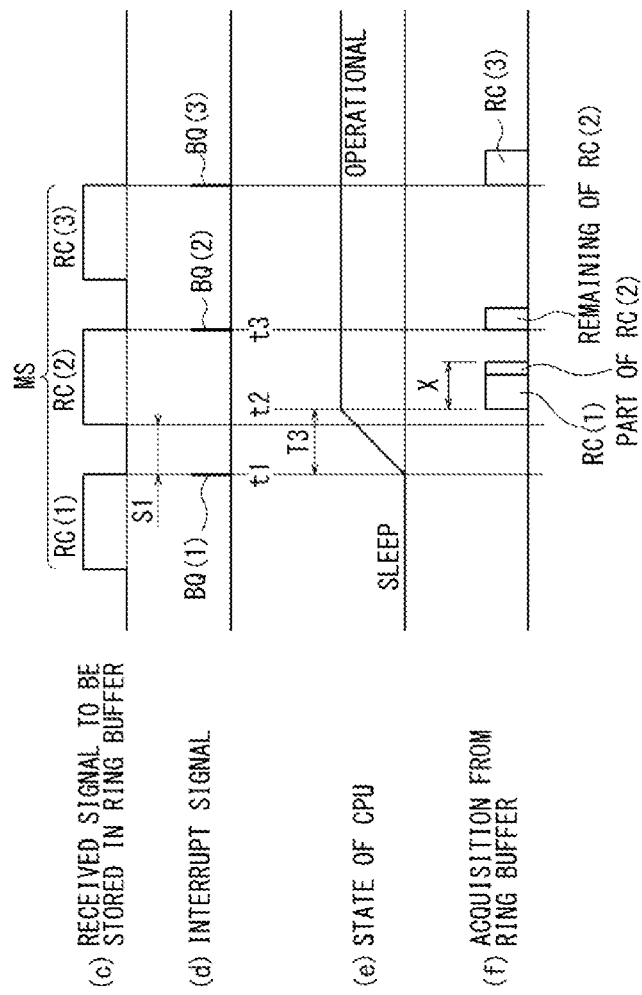
FIG. 3 is an enlarged time chart illustrating a main part of FIG. 2 according to a first example.

FIG. 3 is a time chart illustrating a main part of the main signal MS (unit command signals RC(1) to RC(3)) portion of FIG. 2 with an enlarged time axis.

FIG. 3 illustrates, in (c), received signals stored in the ring buffer 12. FIG. 3 illustrates, in (d), interrupt signals BQ. FIG. 3 illustrates, in (e), state transition of the CPU 13. FIG. 3 illustrates, in (f), acquisition timings from the ring buffer 12.

When the storage of the first unit command signal RC(1) in the ring buffer 12 is completed, the CPU 13 receives the first interrupt signal BQ(1) upon the storage completion, and transitions from the sleep state to the operational state.

However, the state transition of the CPU 13 from the sleep state to the operational state takes time, and thus a transition delay T3 of, for example, about 6 ms occurs until the acquisition communication from the ring buffer 12 becomes possible as illustrated in (e) of FIG. 3.

For this reason, when the CPU 13 acquires, in response to the first interrupt signal BQ(1), the first unit command signal RC(1) stored in the ring buffer 12, the start of this acquisition communication is delayed until time point t2.

Thus, as illustrated in (c) and (f) of FIG. 3, when the reception unit 11 receives the second unit command signal RC(2) between time point t1 at which the interrupt signal BQ(1) is received and time point t2 at which the acquisition communication is started, the reception unit 11 starts to store the received second unit command signal RC(2) in the ring buffer 12.

When the storage of the second unit command signal RC(2) in the ring buffer 12 is completed, the second interrupt signal BQ(2) is input to the CPU 13. In this case, the CPU 13 is already in the operational state at timing (time point t3) at which the second interrupt signal BQ(2) is received. Accordingly, the acquisition communication from the ring buffer 12 is immediately executed without causing the transition delay problem described above.

Furthermore, the acquisition communication from the ring buffer 12 upon receiving the third interrupt signal BQ(3) is also immediately executed without causing the transition delay problem described above.

In the present example, when executing the acquisition communication, the CPU 13 acquires all data stored in the ring buffer 12 within an acquisition communication time period X set in advance, as illustrated in (f) of FIG. 3.

However, as illustrated in FIG. 3, the storage of the second unit command signal RC(2) in the ring buffer 12 is not entirely completed by the end of the set acquisition communication time period X. Thus, data acquired by the CPU 13 is continuously combined date of the first unit command signal RC(1) and a part of the second unit command signal RC(2).

Note that the width of each unit command signal in (f) of FIG. 3 is an image illustrating volume ratio of acquired data, but not indicating its time length.

The CPU 13 acquires each unit command signal RC from the acquired data as follows.

First, since the data length of the unit command signal RC is known, the CPU 13 identifies and separates the first unit command signal RC(1) and the part of the second unit command signal RC(2) based on the known data length.

Accordingly, the first unit command signal RC(1) is acquired in a state that all data necessary for code analysis is completed.

Then, the CPU 13 acquires the remaining of the second unit command signal RC(2) from the ring buffer 12 in response to the second interrupt signal BQ(2) at time point t3 when the storage of the second unit command signal RC(2) in the ring buffer 12 is completed.

Then, the CPU 13 combines thus acquired remaining of the second unit command signal RC(2) with the part of the second unit command signal RC(2) separated before, thereby acquiring the second unit command signal RC(2) in a state that all data necessary for code analysis is completed.

As for the third unit command signal RC(3), the CPU 13 executes the acquisition communication in response to the third interrupt signal BQ(3) when storage of the third unit command signal RC(3) in the ring buffer 12 is completed. Accordingly, the third unit command signal RC(3) in a state that all data necessary for code analysis is completed is acquired by the CPU 13 without data division.

Then, the CPU 13 extracts ID information and command information through code analysis on the acquired unit command signal RC.

Then, in a case that the extracted ID information matches with ID information stored in the EEPROM 14 and all signals are identical, the CPU 13 performs first command processing based on the command information of the unit command signal RC. Accordingly, for example, a command instruction is output to the door actuator 18.

The command instruction is, for example, a door unlock command when the unlock button 8b is pressed at the portable device 2, or a door lock command when the lock button 8a is pressed at the portable device 2.

As returned to the time chart illustrated in FIG. 2, when the reception unit 11 receives the sub signal LP during the operational state after the reception of the main signal MS, the reception unit 11 stores the received sub signal LP in the ring buffer 12.

Accordingly, the interrupt signal BQ due to completion of the storage of the sub signal LP in the ring buffer 12 is input to the CPU 13. When the sub signal LP is received a plurality of times, the interrupt signal BQ due to completion of the storage of the sub signal LP in the ring buffer 12 is input to the CPU 13 at each reception.

Thus, the CPU 13 acquires the sub signal LP from the ring buffer 12 at each time when the interrupt signal BQ is input.

The CPU 13 includes the counter 16 configured to count the number of acquired sub signals LP (the number of times of the acquisition), and determines whether the number of acquired sub signals LP has reached a predetermined number N set in advance.

When the CPU determines that the number of acquired sub signals LP has reached the predetermined number N, the CPU 13 determines that the special operation of pressing the key button 8 for a long time is performed, and performs second command processing. For example, a command instruction (command to move a side glass in the opening direction) is output to the window actuator 19.

Figure 4:
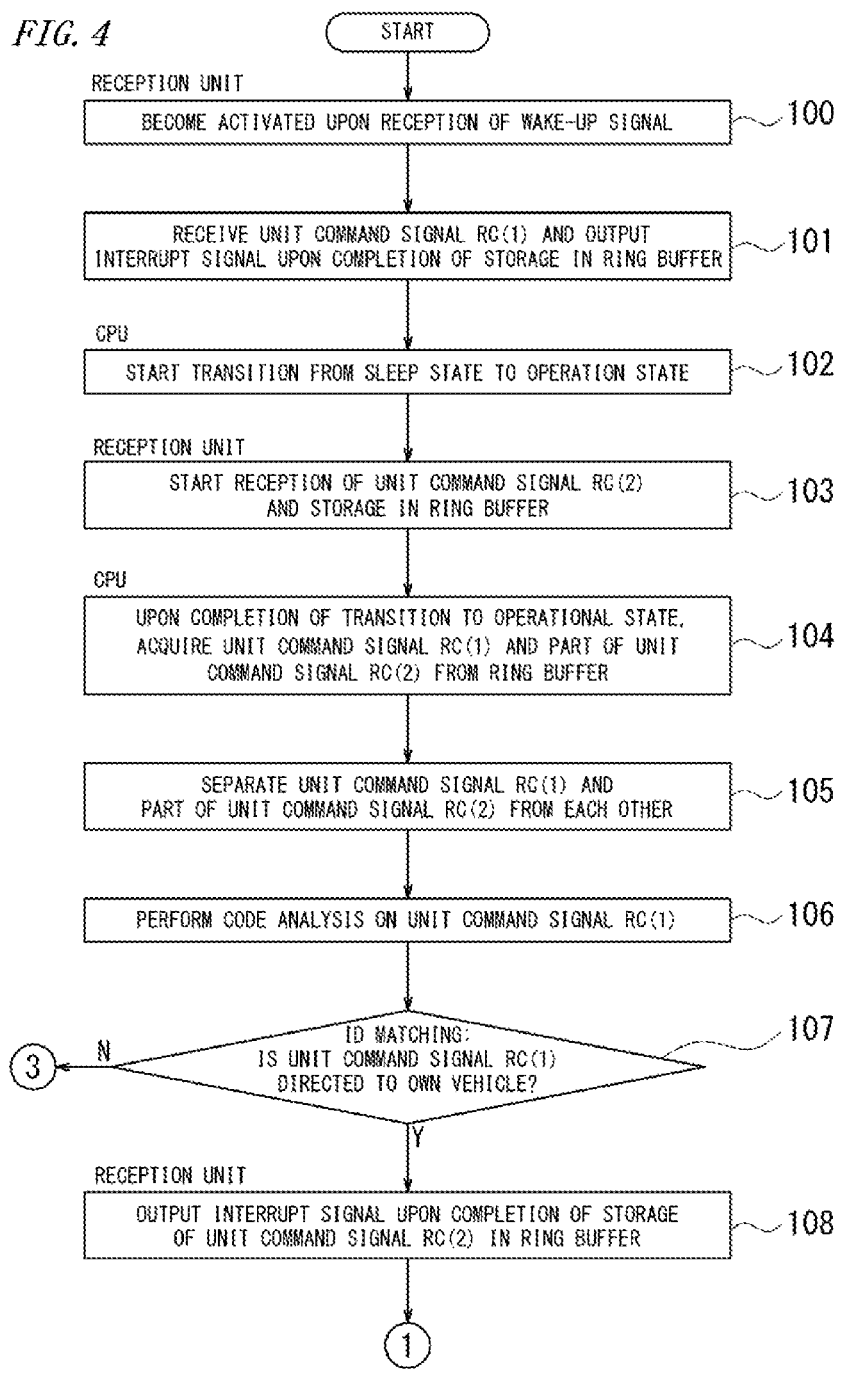
FIG. 4 is a flowchart illustrating process flow at the on-vehicle device according to the first example.
Figure 5:
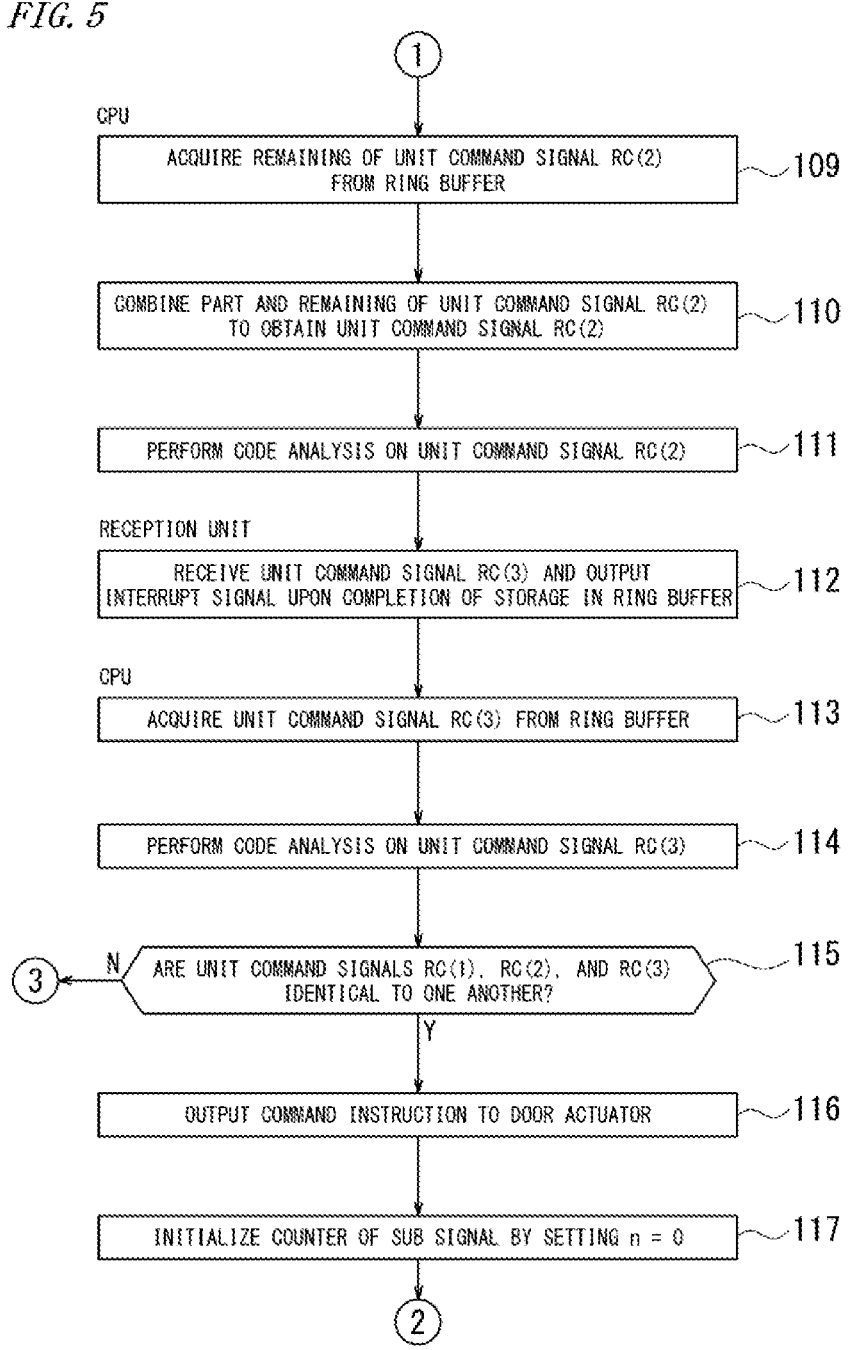
FIG. 5 is a flowchart illustrating the process of the processing at the on-vehicle device according to the first example.
Figure 6:
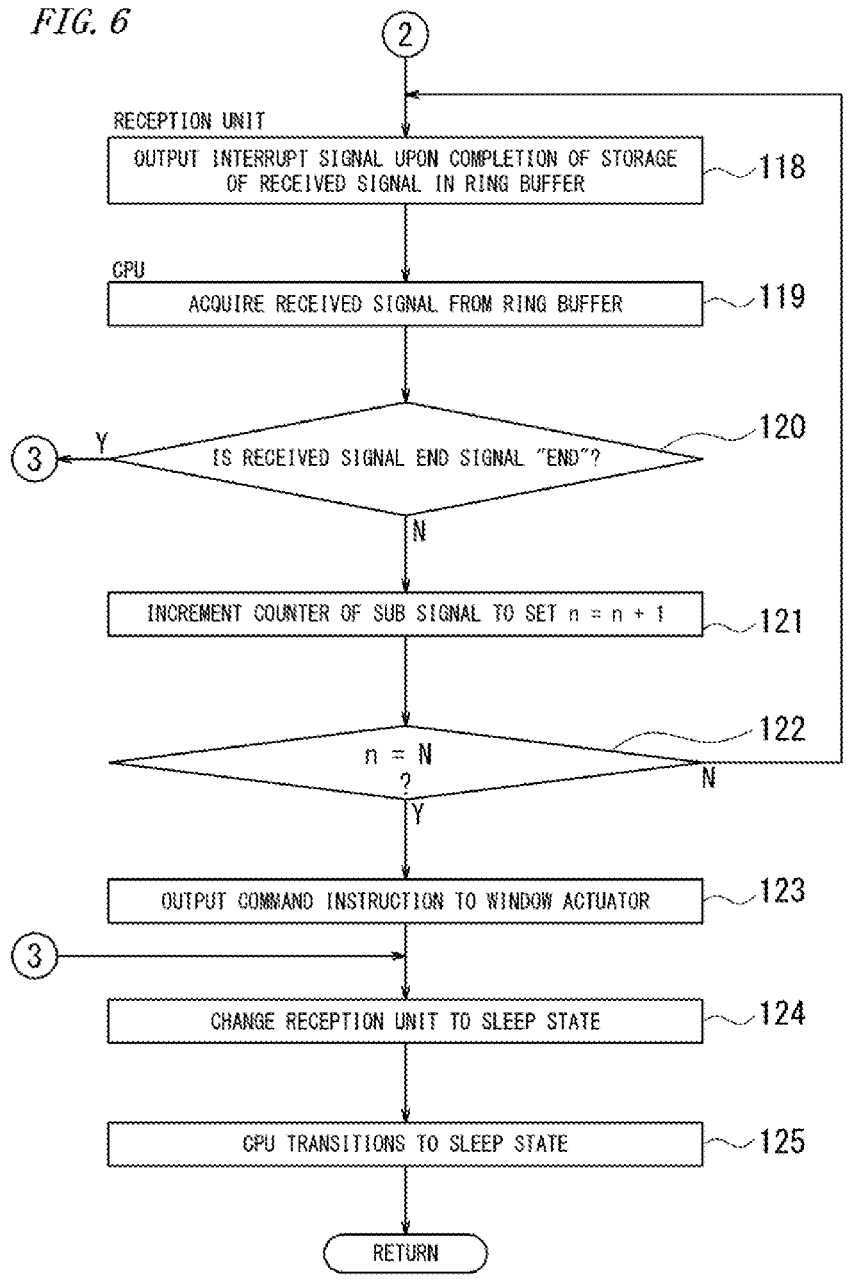
FIG. 6 is a flowchart illustrating the process of the processing at the on-vehicle device according to the first example.

FIGS. 4 to 6 are each a flowchart illustrating process flow at the on-vehicle device 10 according to the first example.

In the flowchart, each step indicates on the upper left side the unit mainly performing its process, though the indication is omitted for steps of which process is performed by the unit identical to that of the previous step. The same is applied to a flowchart according to other examples.

First, the reception unit 11 and the CPU 13 of the on-vehicle device 10 are in the sleep state of the intermittent activation while no signal is transmitted from the portable device 2.

At step 100, when the reception unit 11 is activated upon reception of the wake-up signal WK from the portable device 2, the state of the reception unit 11 is transitioned from the sleep state to the operational state.

Then at step 101, when the reception unit 11 receives the first unit command signal RC(1) following the wake-up signal WK and completes the storage of the received first unit command signal RC(1) in the ring buffer 12, the reception unit 11 outputs the first interrupt signal BQ(1) to the CPU 13.

At step 102, the CPU 13 receives the first interrupt signal BQ(1), and starts transition processing from the sleep state to the operational state.

During the transition delay T3 from the sleep state to the operational state, at step 103, the reception unit 11 starts reception of the second unit command signal RC(2) and storing the received second unit command signal RC(2) in the ring buffer 12.

When the transition processing started at step 102 is completed, at step 104, the CPU 13 in the operational state acquires the first unit command signal RC(1) and a part of the second unit command signal RC(2) stored in the ring buffer 12.

Subsequently at step 105, the CPU 13 separates the first unit command signal RC(1) from the part of the second unit command signal RC(2).

Then at step 106, the CPU performs code analysis on the separated first unit command signal RC(1) and acquires, for example, ID information and command information.

When the code analysis is completed, at step 107, the CPU 13 performs, based on a result of the code analysis, matching between the ID information acquired from the unit command signal RC(1) and ID information stored in the EEPROM 14.

Then, the CPU 13 proceeds to step 108 when the CPU 13 determines, based on the result of the matching, that the unit command signal RC(1) from which the ID information is acquired is directed to the own vehicle ("Y" at step 107). The CPU 13 proceeds to step 124 when the CPU 13 determines that the unit command signal RC(1) is not directed to the own vehicle ("N" at step 107).

At step 108, when the reception unit 11 completes the storage of the second unit command signal RC(2) in the ring buffer 12, the reception unit 11 outputs the second interrupt signal BQ(2) to the CPU 13.

At step 109, the CPU 13, having received the second interrupt signal BQ(2), acquires the remaining data of the second unit command signal RC(2) stored in the ring buffer 12.

Then at step 110, the CPU 13 combines the part of the second unit command signal RC(2), which is separated at step 105 described above, with the remaining data acquired at step 109 described above. Accordingly, the second unit command signal RC(2) is acquired in a stated that all data necessary for code analysis is completed.

Accordingly, at subsequent step 111, the CPU 13 performs code analysis on the second unit command signal RC(2) and acquires, for example, ID information and command information.

Then at step 112, the reception unit 11, when having received the third unit command signal RC(3), stores the received third unit command signal RC(3) in the ring buffer 12. Then, the third interrupt signal BQ(3) is output to the CPU 13 upon completion of the storage in the ring buffer 12.

At step 113, the CPU 13, having received the third interrupt signal BQ(3), acquires the third unit command signal RC(3) stored in the ring buffer 12.

Then at step 114, the CPU 13 performs code analysis on the third unit command signal RC(3) and acquires, for example, ID information and command information.

Subsequently at step 115, the CPU 13 checks whether the unit command signals RC(1) to RC(3) have identical contents based on results of the code analysis at the above-described steps (steps 106, 111, and 114).

Then, when the unit command signals RC(1) to RC(3) have identical contents ("Y" at step 115), the CPU 13 proceeds to processing at step 116. The CPU 13 proceeds to processing at step 124 when the CPU 13 determines that the unit command signals do not have identical contents ("N" at step 115).

At step 116, the CPU 13 performs command processing based on the command information acquired through the code analysis, and outputs, for example, a command instruction for door locking and unlocking to the door actuator 18.

Then at step 117, the CPU 13 initializes the counter 16 of the sub signal LP.

The reception unit 11 is maintained in a state (the operational state) that can receive a signal transmitted from the portable device 2, and thus at step 118, the reception unit 11 outputs the interrupt signal BQ to the CPU 13 when having completed the storage of the received signal in the ring buffer 12.

At step 119, the CPU 13, having received the interrupt signal BQ, acquires the received signal stored in the ring buffer 12.

When it takes a time to perform code analysis or to output a command instruction by command processing, the CPU 13 may perform these pieces of processing in parallel to received signal acquisition executed in response to the interrupt signal BQ.

Then, at step 120, the CPU 13 performs code analysis on the received signal acquired at step 119 and checks whether the received signal is the end signal END directed to the own vehicle.

When the CPU 13 determines that the received signal is the end signal END at step 120 ("Y" at step 120), the CPU 13 proceeds to processing at step 124. When the CPU determines that the received signal is not the end signal END but the sub signal LP ("N" at step 120), the CPU 13 proceeds to processing at step 121.

At step 121, the CPU 13 increments a value n of the counter 16 of the sub signal LP. Then at step 122, the CPU 13 checks whether the counter value n has reached the predetermined number N.

When the CPU 13 determines that the counter value n has reached the predetermined number N ("Y" at step 122), the CPU 13 proceeds to processing at step 123. When the CPU 13 determines that the counter value n has not reached the predetermined number N ("N" at step 122), the CPU 13 returns to the processing at step 118.

At step 123, the CPU 13 performs command processing and outputs, to the window actuator 19, a command instruction for driving the window actuator 19 and instructing door window opening and closing.

Then, after the command instruction for driving the window actuator 19 is output, at step 124, the CPU 13 outputs a sleep command to the reception unit 11 without waiting for reception of the end signal END.

Accordingly, the state of the reception unit 11 is changed from the operational state to the sleep state.

Then, at subsequent step 125, the CPU 13 changes the state of the CPU 13 from the operational state to the sleep state, and ends the series of processing based on the signal (wake-up signal WK) transmitted from the portable device 2.

Accordingly, the reception unit 11 and the CPU 13 of the on-vehicle device 10 are maintained in the sleep state until the reception unit 11 activating intermittently in the sleep state receives a signal (wake-up signal WK) newly transmitted from the portable device 2 at step 100 described above.

In the present control process, in a case that the received signal received after the command instruction is output to the door actuator 18 (step 116) is the sub signal LP ("N" at step 120), the CPU 13 increments the number of times (counter value n) of acquisition of the sub signal LP from the ring buffer 12 by one at each acquisition of the sub signal LP (step 121).

Thus, the CPU 13 repeatedly executes the processing from steps 118 to 122 until the number of times (counter value n) of acquisition of the sub signal LP becomes equal to the predetermined number N (step 122).

Then, while the sub signal LP acquired from the ring buffer 12 is accumulated, the received signal acquired from the ring buffer 12 is the end signal END ("Y" at step 120) before the counter value n reaches the predetermined number N, the CPU 13 transitions to the processing at step 124.

In this case, the CPU 13 changes the reception unit 11 from the operational state to the sleep state by outputting a sleep command CS to the reception unit 11 (step 124; see time point t4 in FIG. 2). Thereafter, the CPU 13 changes the state of the CPU 13 from the operational state to the sleep state (step 125), and ends the series of processing based on the signal (wake-up signal WK) transmitted from the portable device 2.

Accordingly, the CPU 13 ends the processing at this stage without outputting a command instruction to the window actuator 19. The time chart illustrated in FIG. 2 corresponds to this case.

Additionally, a command signal directed to any other vehicle, irrespective of the main signal MS and the sub signal LP, arrives at the on-vehicle device 10.

Thus, when the CPU 13 determines that the main signal MS is not directed to the own vehicle through the processing of ID information matching at step 107 described above ("N" at step 107), the CPU 13 proceeds to the processing at step 124.

Figure 7:
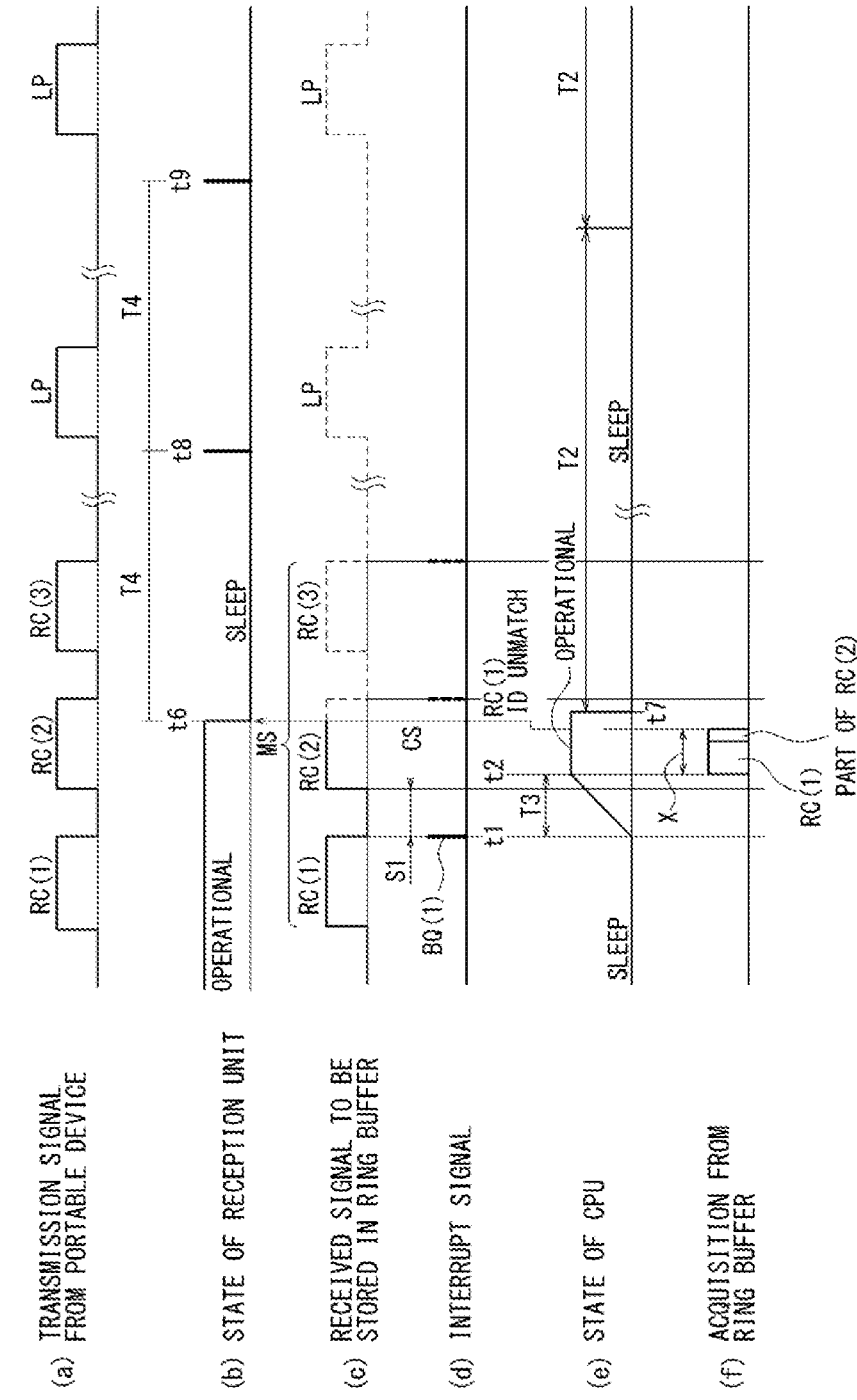
FIG. 7 is a time chart illustrating operation at the on-vehicle device at reception of a signal directed to any other vehicle.

FIG. 7 illustrates a time chart of process flow (steps 107, 124, and 125) when it is determined that the main signal MS is not directed to the own vehicle based on a result of the ID information matching at step 107 ("N" at step 107).

Specifically, when the CPU 13 determines that the main signal MS is not directed to the own vehicle ("N" at step 107), the CPU 13 transmits the sleep command CS to the reception unit 11 at time point t6 before the reception unit 11 receives the sub signal LP (step 124; state transition processing and reception unit control processing). Accordingly, the state of the reception unit 11 transitions from the operational state to the sleep state (power saving state).

The sleep command CS is a command that the CPU 13 makes the reception unit 11 intermittently activated at a timing different from a timing at which the reception unit 11 receives the sub signal LP intermittently transmitted from the portable device 2.

Specifically, the reception unit 11, having been transitioned to the sleep state by the sleep command CS, is intermittently activated at timings of times t8 and t9 illustrated in (b) of FIG. 7. These timings are different from timings of reception of the sub signal LP by the reception unit 11, which are illustrated with dashed lines in (c) of FIG. 7.

Thus, after having received the sleep command CS, the reception unit 11 does not receive the sub signal LP directed to any other vehicle and thus maintains the sleep state.

In the sleep command CS, time period T4 (see (b) of FIG. 7) as an intermittent time length for the intermittent activation of the reception unit 11 is set to be shorter than the time length of the wake-up signal WK (reception unit activation signal) (see (a) of FIG. 1).

As a result, the reception unit 11 does not receive the sub signal LP directed to any other vehicle after having received the sleep command CS. In contrast, when another wake-up signal WK is newly transmitted from the portable device 2, the reception unit 11 receives the wake-up signal WK and reliably transitions (returns) from the sleep state to the operational state.

Then, at time point t7 after time point t6, as illustrated in (e) of FIG. 7, the CPU 13 performs processing of transitioning the state of the CPU 13 from the operational state to the sleep state (step 125; state transition processing).

In this case, the CPU 13 maintains the sleep state because no interrupt signal BQ based on the sub signal LP directed to any other vehicle is input from the reception unit 11.

As described above, according to the present example, the CPU 13 divides the timing of acquisition of the unit command signal RC(2) into the timing of inputting of the first interrupt signal BQ(1) and the timing of inputting of the second interrupt signal BQ(2).

Then, the CPU 13 acquires parts (pieces) of data of the unit command signal RC(2) from the ring buffer 12 at each of the timings and combines the parts to achieve acquisition of the unit command signal RC(2) as having all data necessary for code analysis.

As a result, the CPU 13 can reliably acquire all of the first to third unit command signals RC(1) to RC(3), and perform code analysis on each of the acquired unit command signals RC(1) to RC(3).

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

Furthermore, the reception unit 11 and the CPU 13 each remains in the sleep state against a command signal directed to any other vehicle.

This configuration avoids a situation that the reception unit 11 outputs the interrupt signal BQ at each time receiving the sub signal LP directed to any other vehicle and the CPU 13 repeats data acquisition from the ring buffer 12 in response to the output interrupt signal.

This processing is performed based on the ID information of the first unit command signal RC(1) in the main signal MS. Thus, the processing is executed at an earliest timing, which leads to maximum reduction of unnecessary power consumption at the reception unit 11 and the CPU 13.

EXAMPLE 2

The following describes the operation of the keyless entry system 1 according to a second example.

Figure 8:
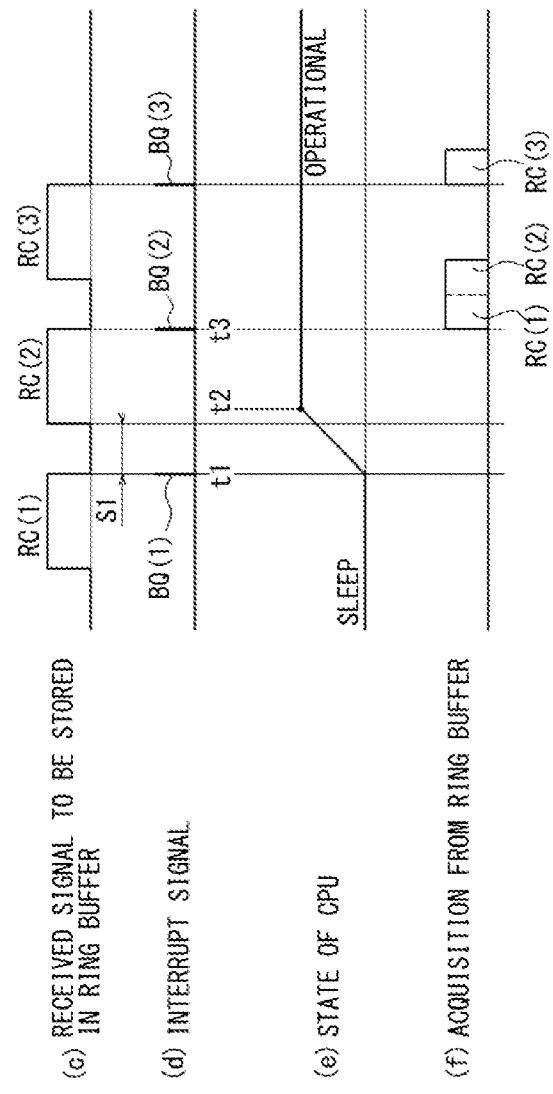
FIG. 8 is a time chart illustrating operation at the on-vehicle device according to a second example.

FIG. 8 is a time chart according to the second example, and corresponds to the above-described time chart illustrated in FIG. 3.

FIG. 8 illustrates, in (c), received signals. FIG. 8 illustrates, in (d), interrupt signals. FIG. 8 illustrates, in (e), state transition of the CPU 13. These (c) to (e) of FIG. 8 are identical to the above-described (c) to (e) of FIG. 3, respectively.

FIG. 8 illustrates, in (f), timings of acquisition from the ring buffer 12 according to the present example.

The second example is different from the above-described first example in acquisition of the main signal MS by the CPU 13 of the on-vehicle device 10.

In the second example, as illustrated in (f) of FIG. 8, when the interrupt signal BQ(1) is input to the CPU 13 upon completion of storage of the first unit command signal RC(1) in the ring buffer 12, the CPU 13 does not acquire received signal from the ring buffer 12 in response to the interrupt signal BQ(1).

Instead, the CPU 13 acquires received signal from the ring buffer 12 for the first time when the second interrupt signal BQ(2) is input from the reception unit 11.

That is, the first unit command signal RC(1) and the second unit command signal RC(2) are already stored in the ring buffer 12 at a timing when the CPU 13 receives the second interrupt signal BQ(2). Thus, data acquired by the CPU 13 after the inputting of the second interrupt signal BQ(2) is combined data of the first unit command signal RC(1) and the second unit command signal RC(2).

The continuous data of the first unit command signal RC(1) and the second unit command signal RC(2) stored in the ring buffer 12 can be all acquired in the acquisition communication time period X.

The CPU 13 identifies and separates the first unit command signal RC(1) and the second unit command signal RC(2) from the combined command signal based on the predetermined data length so that the CPU 13 acquires the signals as the main signals MS independent from each other.

Acquisition of the third unit command signal RC(3) by the CPU 13 is the same as the acquisition processing in the first example.

Figure 9:
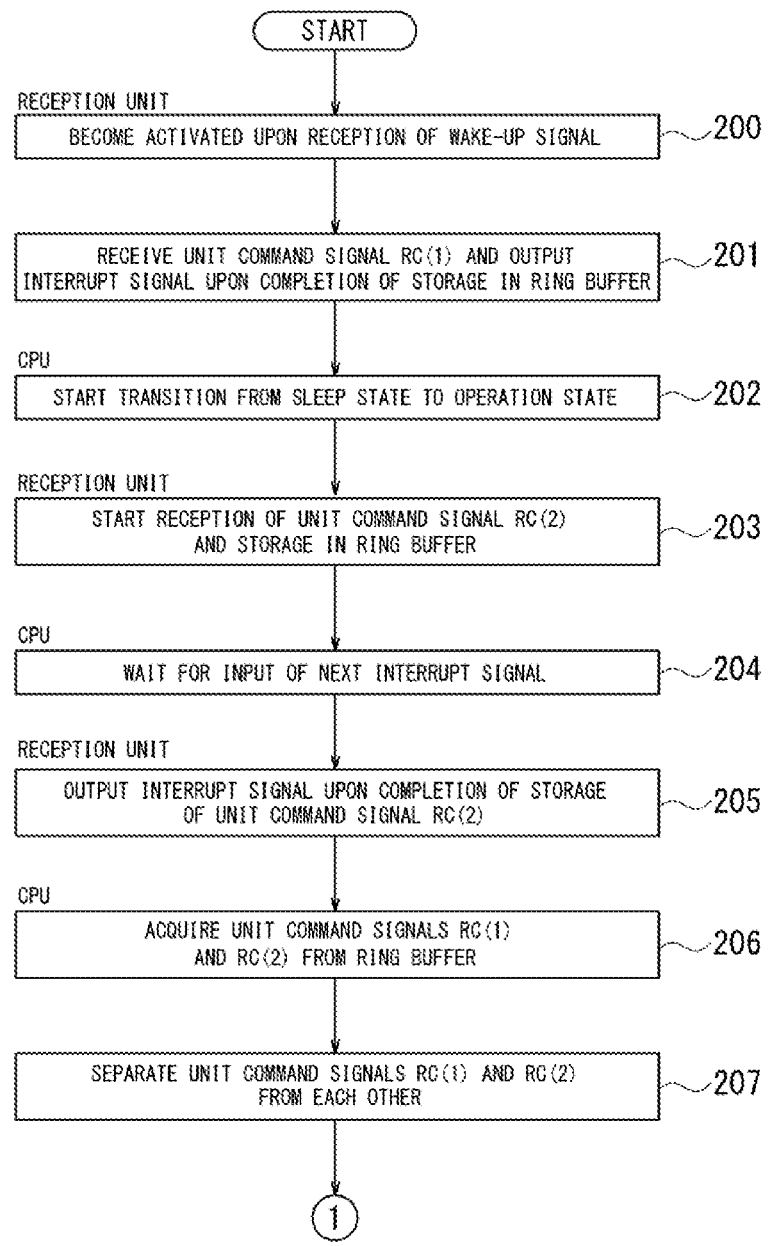
FIG. 9 is a flowchart illustrating process flow at the on-vehicle device according to the second example.
Figure 10:
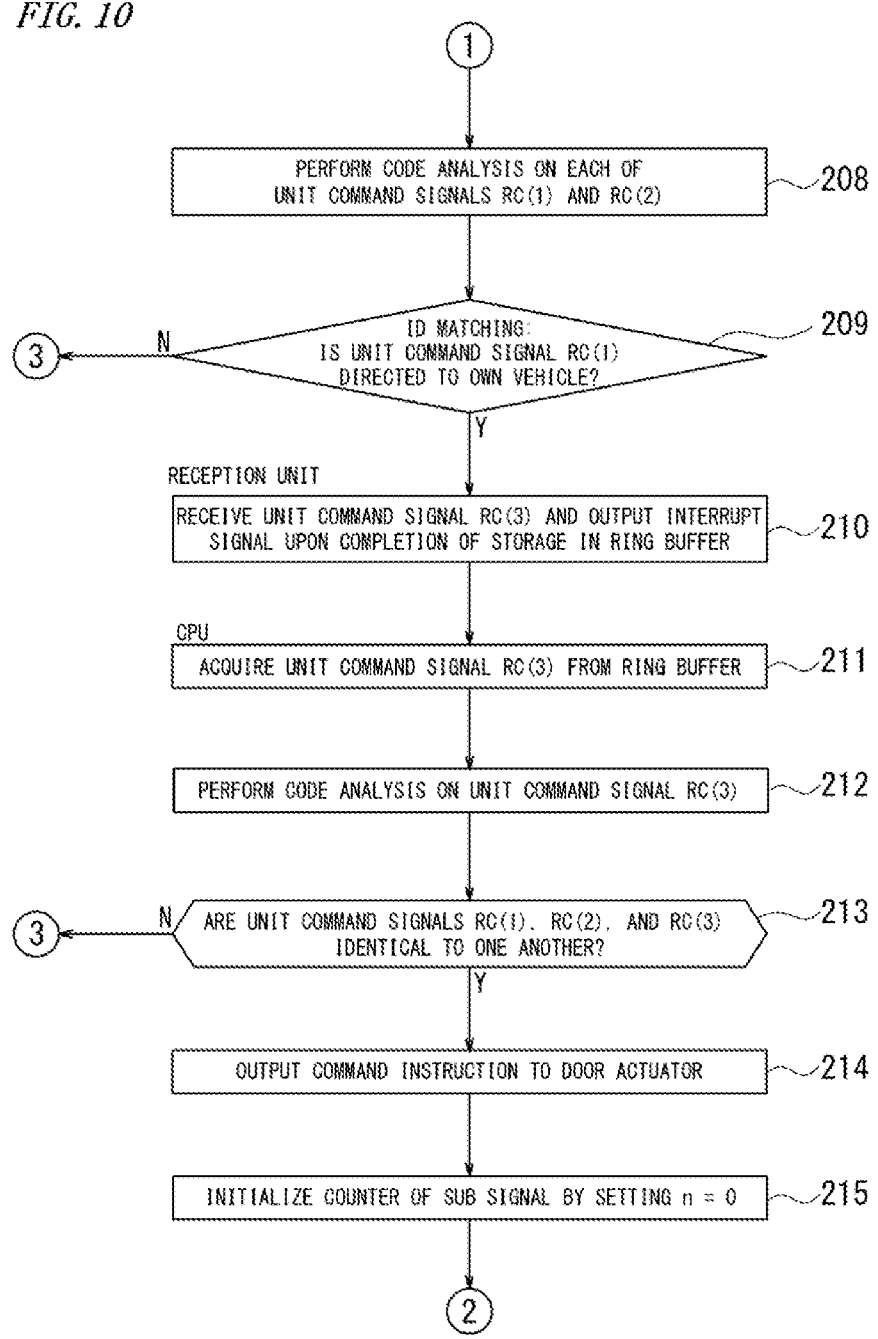
FIG. 10 is a flowchart illustrating the process of the processing at the on-vehicle device according to the second example.
Figure 11:
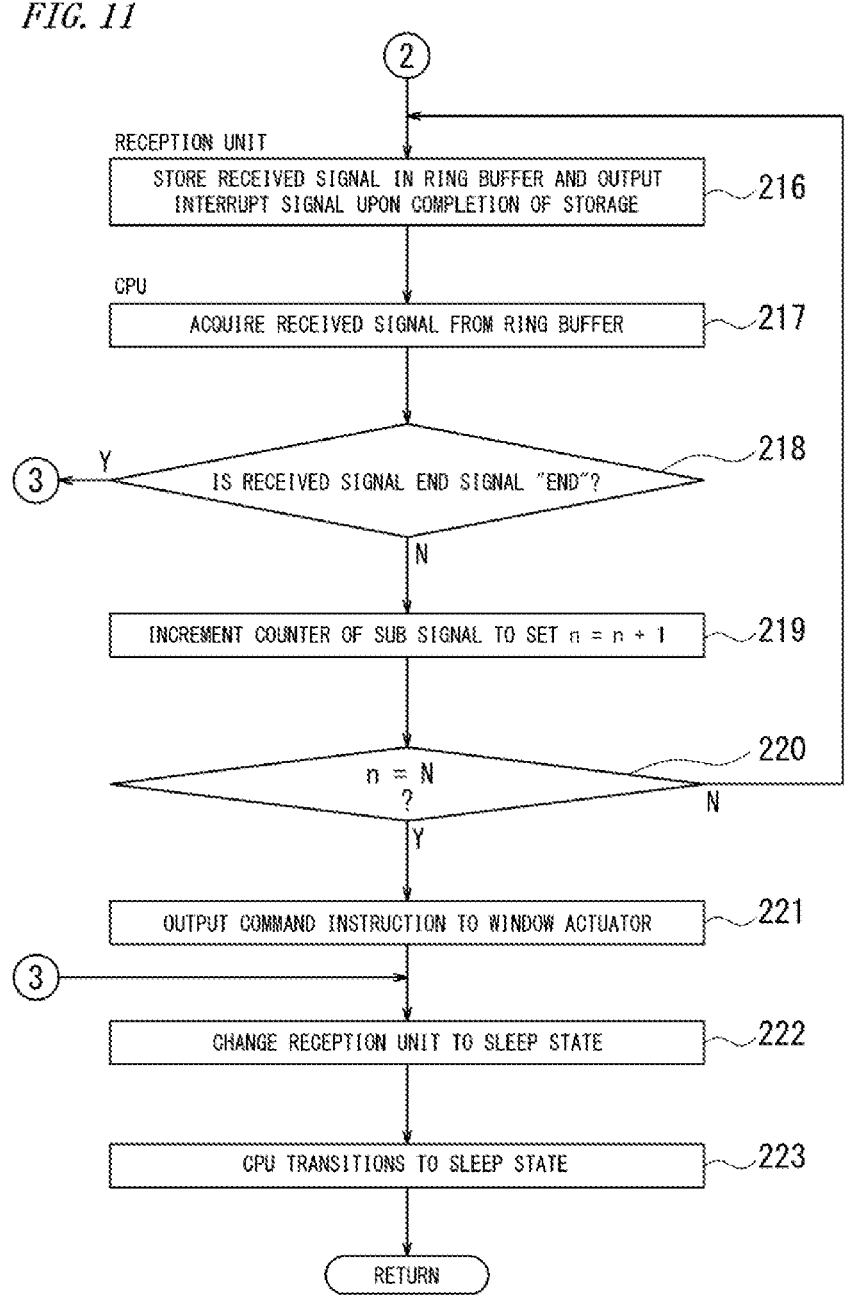
FIG. 11 is a flowchart illustrating the process of the processing at the on-vehicle device according to the second example.

FIGS. 9 to 11 are each a flowchart illustrating process flow according to the second example when the processing is performed at the on-vehicle device 10.

Processing from steps 200 to 203 in FIG. 9 are the same as the processing from steps 100 to 103 in FIG. 4 described above in the first example, respectively.

Once the CPU 13 starts transition from the sleep state to the operational state at step 202, reception of the second unit command signal RC(2) by the reception unit 11 at step 203 is started during the transition delay T3 while the transition to the operational state is started and completed. Then, storage of the received signal in the ring buffer 12 is started.

Then, during the storage of the second unit command signal RC(2) in the ring buffer 12, the CPU 13 completes the transition processing started at step 202 to the operational state. Then, at step 204, the CPU 13 waits until the next (second) interrupt signal BQ(2) is input without performing acquisition from the ring buffer 12.

At step 205, when the reception unit 11 completes the storage of the second unit command signal RC(2) in the ring buffer 12, the reception unit 11 outputs the second interrupt signal BQ(2) to the CPU 13 at time point t3 at which the storage is completed.

At step 206, the CPU 13 receives the second interrupt signal BQ(2) and acquires both of the first unit command signal RC(1) and the second unit command signal RC(2) stored in the ring buffer 12.

The data thus acquired is combined data of the first unit command signal RC(1) and the second unit command signal RC(2).

Thus, at subsequent step 207, the CPU 13 identifies a part of the first unit command signal RC(1) and a part of the second unit command signal RC(2) in the acquired data. Then, the CPU 13 separates the data into the first unit command signal RC(1) and the second unit command signal RC(2).

Then, at step 208 illustrated in FIG. 10, the CPU 13 performs code analysis on each of the first unit command signal RC(1) and the second unit command signal RC(2) and acquires, for example, ID information and command information.

At step 209, the CPU 13 performs, based on a result of the code analysis, matching between the ID information acquired from the unit command signal RC(1) and ID information stored in the EEPROM 14.

Then, when the CPU 13 determines, as the result of the matching, that the unit command signal RC(1) from which the ID information is acquired is directed to the own vehicle ("Y" at step 209), the CPU 13 proceeds to step 210. When the CPU 13 determines that the unit command signal RC(1) is not directed to the own vehicle ("N" at step 209), the CPU 13 proceeds to step 222.

At step 210, the reception unit 11 receives the third unit command signal RC(3). When the reception unit 11 completes storage of the third unit command signal RC(3) to the ring buffer 12, the reception unit 11 outputs the third interrupt signal BQ(3) to the CPU 13.

The processing from steps 210 to 223 is the same as the processing at steps 112 (refer to FIG. 5) to 125 (refer to FIG. 6) described above in the first example, respectively, and thus description of the processing will be omitted below.

Any other configuration is the same as that in the first example.

As described above, according to the present example, the CPU 13 shifts the timing of acquisition of the unit command signal RC(1) to the timing of inputting of the second interrupt signal BQ(2), and acquires the unit command signal RC(1) and the unit command signal RC(2) together from the ring buffer 12.

Then, the CPU 13 separates the acquired unit command signal RC(1) and the unit command signal RC(2) so that the unit command signal RC(2) is acquired as having all data completed.

As a result, the CPU 13 reliably acquires all of the three unit command signals RC(1) to RC(3) as the main signal MS, and can perform code analysis on each unit command signal.

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

When it is confirmed that the received unit command signal RC(1) is a command signal directed to any other vehicle at step 209 described above, the reception unit 11 and the CPU 13 become the sleep state (steps 222 and 223).

This configuration avoids a situation that the reception unit 11 outputs the interrupt signal BQ at each time receiving the sub signal LP directed to any other vehicle and the CPU 13 repeats data acquisition from the ring buffer 12 in response to the interrupt signal.

Furthermore, the CPU 13 does not need to perform, after acquisition in response to the second interrupt signal BQ(2), the processing of combining a part of the second unit command signal RC(2) obtained by the first acquisition and the remaining of the second unit command signal RC(2) obtained by the second acquisition. This leads to a control speed faster than that in the first example.

In addition, since the CPU 13 waits while the reception unit is receiving the second unit command signal RC(2), the reception at the reception unit is not encumbered by noise generated by the CPU 13 at acquisition from the ring buffer 12.

EXAMPLE 3

The following describes the operation of the keyless entry system 1 according to a third example.

Figure 12:
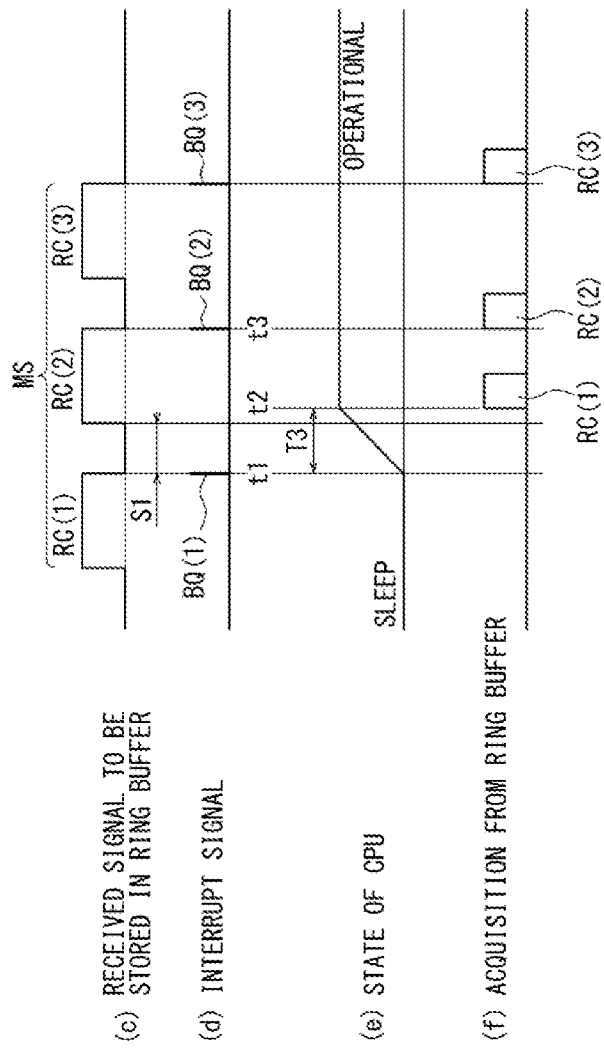
FIG. 12 is a time chart illustrating operation at the on-vehicle device according to a third example.

FIG. 12 is a time chart according to the third example, and corresponds to the above-described time chart illustrated in FIG. 3. FIG. 12 illustrates, in (c), received signals. FIG. 12 illustrates, in (d), interrupt signals. FIG. 12 illustrates, in (e), state transition of the CPU 13. These (c) to (e) of FIG. 8 are identical to the above-described (c) to (e) of FIG. 3, respectively.

FIG. 12 illustrates, in (f), timings of acquisition from the ring buffer 12 according to the present example.

The third example is different from the above-described first and second examples in acquisition of the main signal by the CPU 13 of the on-vehicle device 10.

In the third example, as illustrated in (d) and (e) of FIG. 12, the first interrupt signal BQ(1) is input to the CPU 13 upon completion of storage of the first unit command signal RC(1) in the ring buffer 12 (time point t1). Then, the CPU 13 starts transition from the sleep state to the operational state, and becomes the operational state at time point t2 when the transition delay T3 has elapsed.

Then, after time point t2 at which the transition to the operational state is completed, the CPU 13 is capable of performing data acquisition from the ring buffer 12.

In the first example described above, the CPU 13, having become the operational state after the transition delay T3 has elapsed, starts acquisition of the first unit command signal RC(1) at time point t2 when the CPU becomes the operational state. Thus, within the predetermined acquisition communication time period X starting at time point t2, a part of the second unit command signal RC(2) is received and stored in the ring buffer 12 together with the first unit command signal RC(1).

However, in the third example, as illustrated in (f) of FIG. 12, the CPU 13 performs acquisition as described below at acquisition communication started in response to the first interrupt signal BQ(1). Specifically, the CPU 13 first performs acquisition of the first unit command signal RC(1) only with leaving the second unit command signal RC(2) among unit command signals RC stored in the ring buffer 12.

Then, the CPU 13 acquires complete data of the second unit command signal RC(2) from the ring buffer 12 in response to the second interrupt signal BQ(2) at time point t3 upon completion of the storage of the second unit command signal RC(2) in the ring buffer 12.

The acquisition of the third unit command signal RC(3) by the CPU 13 is achieved by the same processing in the first example.

Figure 13:
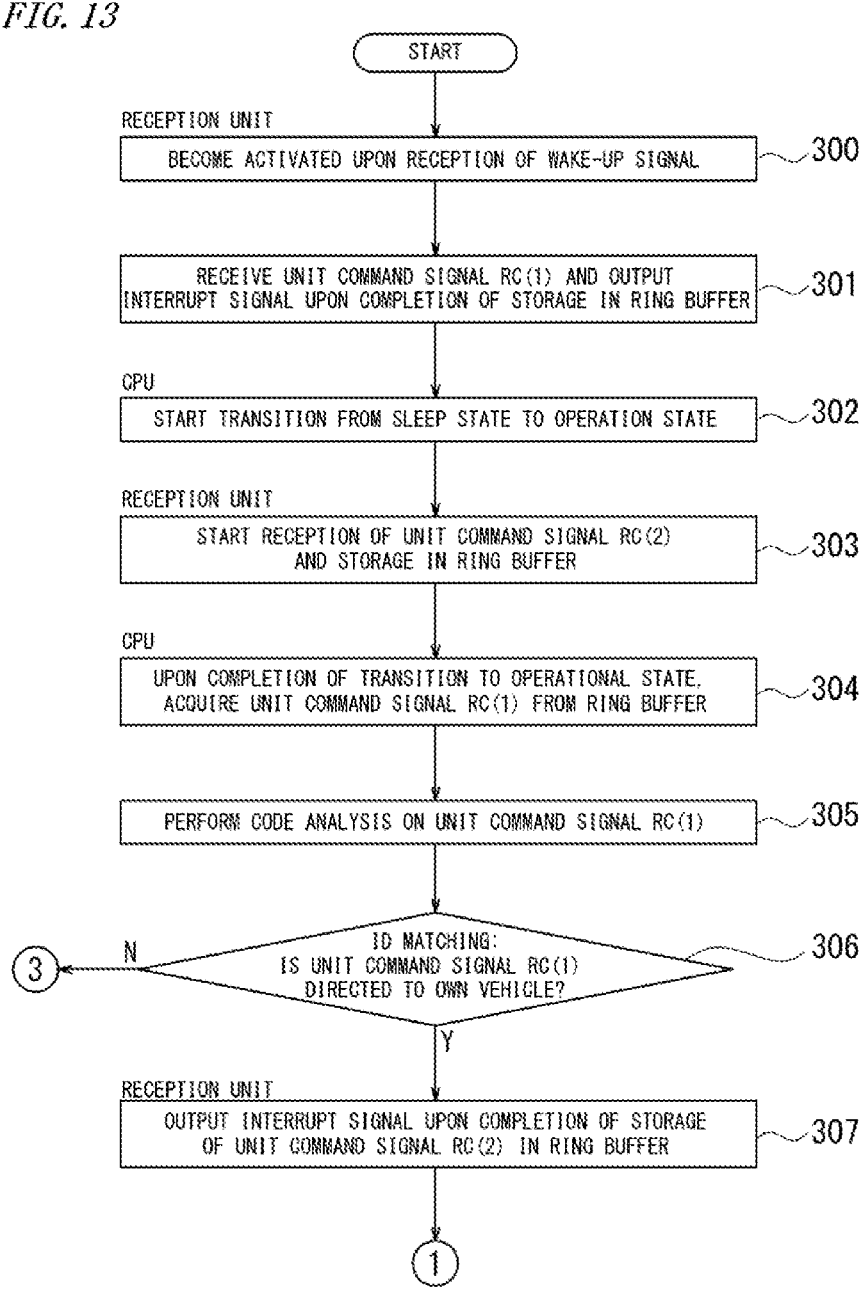
FIG. 13 is a flowchart illustrating process flow at the on-vehicle device according to the third example.
Figure 14:
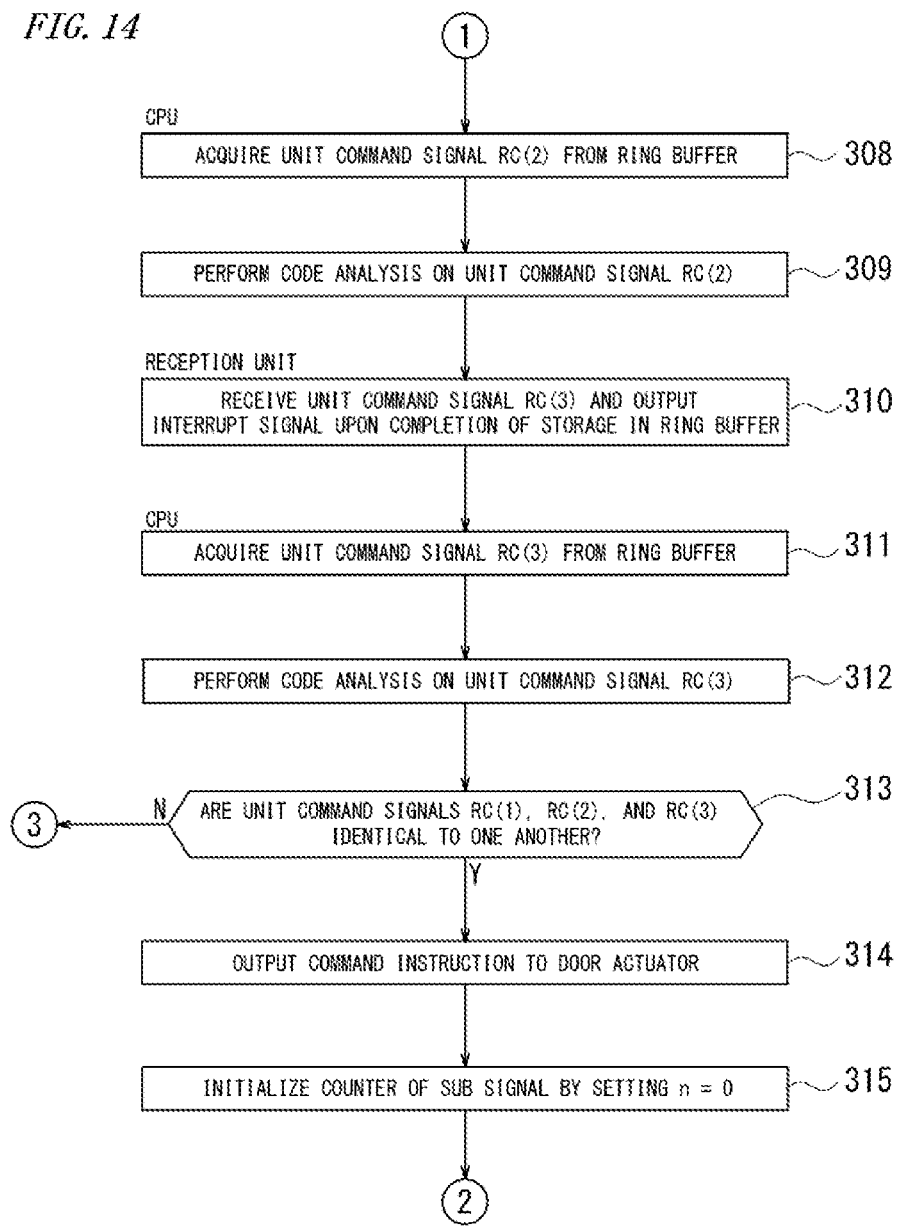
FIG. 14 is a flowchart illustrating the process of the processing at the on-vehicle device according to the third example.

FIGS. 13 to 15 are each a flowchart illustrating process flow according to the third example when the processing is performed at the on-vehicle device 10.

Processing from steps 300 to 303 in FIG. 13 are the same as the processing from steps 100 to 103 in FIG. 4 described above in the first example, respectively.

Once the CPU 13 starts transition from the sleep state to the operational state at step 302, reception of the second unit command signal RC(2) by the reception unit 11 at step 303 is started during the transition delay T3 while the transition to the operational state is started and completed. Then, storage of the received signal in the ring buffer 12 is started.

Then, the CPU 13 completes the transition processing started at step 302 to the operational state during the storage of the second unit command signal RC(2) in the ring buffer 12. Then, at step 304, the CPU 13 only acquires the first unit command signal RC(1) stored in the ring buffer 12.

At a timing (time point t2) when the transition of the CPU 13 to the operational state is completed, the first unit command signal RC(1) as having all data necessary for code analysis and a part of the second unit command signal RC(2) are stored in the ring buffer 12. This part of the second unit command signal RC(2) is incomplete data including not all data necessary for code analysis.

When only the first unit command signal RC(1) is acquired, the CPU 13 performs code analysis on the first unit command signal RC(1) at step 305 and acquires, for example, ID information and command information.

When the code analysis is completed, at step 306, the CPU 13 performs, based on a result of the code analysis, matching between the ID information acquired from the unit command signal RC(1) and ID information stored in the EEPROM 14.

Then, when the CPU 13 determines, based on the result of the matching, that the unit command signal RC(1) from which the ID information is acquired is directed to the own vehicle ("Y" at step 306), the CPU 13 proceeds to step 307. When the CPU 13 determines that the unit command signal RC(1) is not directed to the own vehicle ("N" at step 306), the CPU 13 proceeds to step 322.

At step 307, when the reception unit 12 completes the storage of the second unit command signal RC(2) in the ring buffer 12, the reception unit 11 outputs the second interrupt signal BQ(2) to the CPU 13.

At step 308, having received the second interrupt signal BQ(2), the CPU 13 acquires the second unit command signal RC(2) from the ring buffer 12.

Then at step 309, the CPU 13 performs code analysis on the second unit command signal RC(2) and acquires, for example, ID information and command information.

Then, when having received the third unit command signal RC(3) at step 310, the reception unit 11 stores the received third unit command signal RC(3) in the ring buffer 12. Then, the third interrupt signal BQ(3) is output to the CPU 13 upon completion of the storage in the ring buffer 12.

The processing from steps 310 to 323 is the same as the processing from steps 112 (see FIG. 5) to 125 (see FIG. 6) described above in the first example, respectively, and thus description of the processing will be omitted below.

As described above, according to the present example, the CPU 13 adjusts the amount of data to acquire from the ring buffer 12 between the timing of inputting of the first interrupt signal BQ(1) and the timing of inputting of the second interrupt signal BQ(2). Specifically, the CPU 13 acquires only data of the unit command signal RC(1) from the ring buffer 12 at the timing of inputting of the first interrupt signal BQ(1). Then, at the timing of inputting of the second interrupt signal BQ(2), the CPU 13 acquires data of the unit command signal RC(2) from the ring buffer 12. Accordingly, the CPU 13 achieves acquisition of the unit command signal RC(2) as having all data completed. As a result, the CPU 13 reliably acquires the three unit command signals RC(1) to RC(3) all as the main signal MS, and can perform code analysis on each unit command signal.

With this configuration, the keyless entry system 1 achieves high communication accuracy with added redundancy for the main signal MS and can execute a command corresponding to the operated key button 8 of the portable device 2 at high reliability.

In addition, the keyless entry system 1 can execute another command when the key button 8 is pressed for a long time, which leads to improved convenience.

In addition, the keyless entry system 1 achieves high communication accuracy with added redundancy for the sub signal LP by counting the signal up to the predetermined number N.

When it is confirmed that the received unit command signal RC(1) is a command signal directed to any other vehicle at step 306 described above, the reception unit 11 and the CPU 13 become the sleep state (steps 322 and 323).

This configuration avoids a situation that the reception unit 11 outputs the interrupt signal BQ at each time receiving the sub signal LP directed to any other vehicle and the CPU 13 repeats data acquisition from the ring buffer 12 in response to the interrupt signal.

The processing is performed based on the ID information of the first unit command signal RC(1) in the main signal MS. Thus, the processing is executed at an earliest timing, which leads to maximum reduction of unnecessary power consumption at the reception unit 11 and the CPU 13.

Furthermore, the CPU 13 does not need to perform, after acquisition in response to the second interrupt signal BQ(2), the processing of combining a part of the second unit command signal RC(2) obtained by the first acquisition and the remaining of the second unit command signal RC(2) obtained by the second acquisition. This leads to a control speed faster than that in the first example.

In the present embodiment, the door actuator 18 and the window actuator 19 each correspond to an on-vehicle component in the invention. The CPU 3 corresponds to a portable-side control unit. The CPU 13 corresponds to an on-vehicle device-side control unit. The EEPROM 14 corresponds to a storage unit.

The first unit command signal RC(1) corresponds to a main signal as received first in the invention.

In the time chart illustrated in FIG. 7, the transition of the reception unit 11 from the operational state to the sleep state at time t6 corresponds to the reception unit control processing, and the transition of the CPU 13 itself to the sleep state at time t7 corresponds to the state transition processing.

As described above in the embodiments:

(1) In the vehicle keyless entry system 1 (vehicle keyless system) including:
- the portable device 2 configured to transmit a command signal; and
- the on-vehicle device 10 configured to receive the command signal transmitted from the portable device 2 and control an on-vehicle component (the door actuator 18 or the window actuator 19) in response to the command signal as received,
- the portable device 2 includes the operation unit 4, the CPU 3 (portable-side control unit), and the transmission unit 7,
- the CPU 3:
  - transmits, when an operation is made on the operation unit 4, the unit command signals RC(1) to RC(3) including the ID information unique to the portable device 2 as the main signal MS from the transmission unit 7, and
  - transmits, when an operational mode of the operation unit 4 following the operation made on the operation unit 4 satisfies requirement (for example, long press) of a special mode, a unit command signal RC including the ID information as the sub signal LP subsequent to the main signal MS from the transmission unit 7, the on-vehicle device 10 includes:
- the reception unit 11 configured to receive the command signal (including the unit command signals RC transmitted as the main signal MS and the sub signal LP),
- the CPU 13 (on-vehicle device-side control unit) configured to execute command processing of controlling the on-vehicle component based on the command signal as received by the reception unit 11, and
- the EEPROM 14 (storage unit) configured to store ID information unique to a portable device 2 to which the on-vehicle device 10 is available, and the CPU 13 executes the state transition processing of transitioning the CPU 13 of the on-vehicle device 10 to a sleep state (power saving state) in which the CPU 13 intermittently operates and processing is not performed on the sub signal LP transmitted subsequent following the main signal MS in a case that the unit command signals RC(1) to RC(3) transmitted as the main signal MS are received, and the ID information included in the received main signal MS does not match with the ID information stored in the EEPROM 14.

According to this configuration, when the on-vehicle device 10 receives a unit command signal transmitted as the main signal MS and directed to any other vehicle, ID information included in the received command signal is different from ID information stored in the EEPROM 14. In this case, the CPU 13 of the on-vehicle device 10 transitions to a sleep state at the timing of the reception of the main signal MS, and no processing is performed on the sub signal LP transmitted subsequent to the main signal MS.

Thus, the CPU 13 of the on-vehicle device 10 does not perform processing on a unit command signal RC transmitted as the sub signal LP and directed to any other vehicle, and thus electric power consumption at the on-vehicle device 10 is reduced, which avoids unnecessary electrical power consumption.

(2) The main signal MS includes the unit command signals RC(1) to RC(3) that are a plurality of identical signals consecutive with a predetermined time interval therebetween. The CPU 13 executes the state transition processing of transitioning the CPU 13 of the on-vehicle device 10 to the sleep state when the ID information included in the unit command signal RC(1) of the main signal as received first does not match with the ID information stored in the EEPROM 14.

By this configuration, the CPU 13 of the on-vehicle device 10 transitions to the sleep state when it is found that the ID information included in the unit command signal RC(1) as received first among the plurality of unit command signals RC(1) to RC(3) does not match with the ID information stored in the EEPROM 14. Thus, the CPU 13 transitions to the sleep state in a shortest time when the on-vehicle device 10 receives the main signal MS directed to any other vehicle.

Accordingly, unnecessary electrical power consumption at the on-vehicle device 10 is reduced at an earliest timing.

(3) The sub signal LP includes unit command signals RC that are a plurality of identical signals intermittently transmitted. The reception unit 11 of the on-vehicle device 10 is configured to output, at each reception of the sub signal LP, the interrupt signal BQ instructing acquisition of the sub signal LP from the ring buffer 12 to the CPU 13. The CPU 13 executes the reception unit control processing of transitioning the reception unit 11 to a sleep state (power saving state) when transitioning the CPU 13 to the sleep state because the ID information included in the received main signal MS does not match with the ID information stored in the EEPROM 14.

Accordingly, when the main signal MS directed to any other vehicle is received by the on-vehicle device 10, the reception unit 11 transitions to the sleep state while the CPU 13 of the on-vehicle device 10 transitions to the sleep state.

Accordingly, the reception unit 11 does not receive the sub signal LP transmitted subsequent to the main signal MS and directed to any other vehicle. Thus, no interrupt signal BQ is output to the CPU 13 at a timing when the reception unit 11 receives the sub signal LP and storage of the received sub signal LP in the ring buffer 12 is completed.

Thus, the CPU 13 in the sleep state does not become activated by receiving input of the interrupt signal BQ, and is maintained in the sleep state. Accordingly, the CPU 13 does not become activated in response to the interrupt signal BQ, and thus unnecessary electric power consumption at the CPU 13 is excellently prevented.

In addition, since the reception unit 11 also becomes the sleep state, electric power consumption at the reception unit 11 is also reduced.

In other words, the reception unit 11 and the CPU 13 are each in the sleep state against a command signal directed to any other vehicle. This avoids such a situation that the reception unit 11 outputs the interrupt signal BQ at each reception of the sub signal LP directed to any other vehicle and the CPU 13 repeats data acquisition from the ring buffer 12 in response to the interrupt signal.

This processing is performed based on the ID information of the first unit command signal RC(1) in the main signal MS and thus the execution timing thereof is earliest, which leads to maximum reduction of unnecessary electric power consumption at the reception unit 11 and the CPU 13.

(4) When the CPU 13 executes the reception unit control processing, the reception unit 11 transitions to the sleep state in which the reception unit 11 is intermittently activated at a timing that is different from that of the sub signal LP including a plurality of unit command signals RC intermittently transmitted.

By this configuration, the reception unit 11 having transitioned to the sleep state is intermittently activated at a timing different from the transmission timing of the intermittently transmitted sub signal LP.

Thus, when it has been determined that the main signal MS directed to any other vehicle is received and the reception unit 11 has transitioned to the sleep state, the reception unit 11 intermittently activated does not receive the sub signal LP directed to any other vehicle and transmitted subsequent to the main signal MS that has been received and determined to be directed to any other vehicle.

Accordingly, the reception unit 11 does not receive the sub signal LP transmitted subsequent to the main signal MS directed to any other vehicle nor output an interrupt signal to the CPU 13, and thus the CPU in the sleep state is appropriately prevented from becoming activated in response to the sub signal LP directed to any other vehicle.

Power consumption at the on-vehicle device 10 (CPU 13) is also reduced in this manner.

The CPU 3 of the portable device 2 is configured to transmit, before the main signal MS, the wake-up signal WK (reception unit activation signal) for activating the reception unit 11 of the on-vehicle device 10. An intermittent time length T1 in which the reception unit 11 of the on-vehicle device 10 is intermittently activated in the sleep state is shorter than the time length of the wake-up signal WK.

By this configuration, the portable device 2 can make the reception unit 11 of the on-vehicle device 10 in the sleep state activated by transmitting the wake-up signal WK only once.

Thus, the main signal MS transmitted subsequent to the wake-up signal WK is reliably received by the on-vehicle device 10.

Furthermore, even after the reception unit 11 has been transitioned to the sleep state, the reception unit 11 is reliably activated again when a new command signal is transmitted from the portable device 2.

When the CPU 13 executes the state transition processing of transitioning the CPU 13 to the sleep state (power saving state) of intermittent activation and in a case that the reception unit control processing of transitioning the reception unit 11 to the sleep state (power saving state) is also executed, the CPU 13 starts the transition of the CPU 13 to the sleep state after the transition of the reception unit 11 to the sleep state.

If the transition of the reception unit 11 to the sleep state is performed after the transition of the CPU 13 to the sleep state, there is a possibility that the reception unit 11 receives a command signal (the wake-up signal WK or the main signal MS) before the transition of the reception unit 11 to the sleep state is completed. In such a case, the CPU 13 needs to be transitioned to the operational state right after having transitioned to the sleep state.

When the reception unit 11 is transitioned to the sleep state earlier than the CPU 13 through the above-described configuration, power consumption needed to switch the state of the CPU 13 is reduced.

The embodiment describes the exemplary keyless entry system in which a command target is mainly door locking and unlocking, but the command target is not limited thereto and may be optional control such as engine starting and stopping.

The special operation of the portable device 2 is not limited to long press of the key button 8, but may be achieved in any optional aspect involving, for example, a plurality of times of discontinuous operations.

The command target through the special operation is not limited to door window opening and closing.

In the embodiment, the on-vehicle device 10 can execute door locking and unlocking as a main command target in response to the main signal MS, and also execute door window opening and closing as another command target in response to the sub signal LP. However, the processing of sleeping the reception unit 11 and the CPU 13 in response to the main signal MS not directed to the own vehicle is effective also when, at a certain vehicle, the on-vehicle device 10 does not execute another command based on the sub signal LP. This configuration avoids repeated operation of the reception unit 11 and the CPU 13 at each arrival of the sub signal LP directed to any other vehicle.

In the examples, code analysis is performed on each unit command signal RC at acquisition thereof, but may be collectively performed on the three unit command signals of the main signal MS after all unit command signals are acquired.

The main signal MS includes the three unit command signals RC(1) to RC(3) to add redundancy, but is not limited thereto. The number of unit command signals may be any optional number equal to two or larger.

REFERENCE SIGNS LIST

1 keyless entry system
2 portable device

3 CPU
4 operation unit
5 EEPROM
6 RAM
7 transmission unit
8 key button
8a lock button
8b unlock button
10 on-vehicle device
11 reception unit
12 ring buffer
13 CPU
14 EEPROM
15 RAM
16 counter
18 door actuator
19 window actuator
BQ interrupt signal
CS sleep command
END end signal
MS main signal
LP sub signal
RC unit command signal
WK wake-up signal

What is claimed is:

1. A vehicle keyless system comprising:
a portable device configured to transmit a command signal; and
an on-vehicle device configured to receive the command signal transmitted from the portable device and control an on-vehicle component in response to the command signal as received, wherein
the portable device includes an operation unit, a portable-side control unit, and a transmission unit,
the portable-side control unit:
transmits, when an operation is made on the operation unit, the command signal including ID information unique to the portable device as a main signal from the transmission unit, and
transmits, when an operational mode of the operation unit following the operation made on the operation unit satisfies requirement of a special mode, the command signal including the ID information as a sub signal subsequent to the main signal from the transmission unit,
the on-vehicle device includes:
a reception unit configured to receive the command signal,
an on-vehicle device-side control unit configured to execute command processing of controlling the on-vehicle component based on the command signal as received by the reception unit, and
a storage unit configured to store ID information unique to a portable device to which the on-vehicle device is available,
the sub signal includes a plurality of identical signals intermittently transmitted,
the on-vehicle device-side control unit executes state transition processing in a case that the command signal transmitted as the main signal is received and the ID information included in the main signal as received does not match with the ID information stored in the storage unit, and
in the state transition processing, the reception unit is transitioned to a sleep state in which the reception unit is intermittently activated at a timing that is different from a timing of the sub signal intermittently transmitted and the on-vehicle device is transitioned to a power saving state in which processing is not performed on the sub signal transmitted subsequent to the main signal.

2. The vehicle keyless system according to claim 1, wherein
the main signal includes a plurality of identical signals that are consecutive with a predetermined time interval therebetween, and
the on-vehicle device-side control unit executes the state transition processing when the ID information included in the main signal as received first does not match with the ID information stored in the storage unit.

3. The vehicle keyless system according to claim 1, wherein
the reception unit outputs, at each reception of the sub signal, an interrupt signal instructing acquisition of the sub signal to the on-vehicle device-side control unit.

4. The vehicle keyless system according to claim 1, wherein
the portable-side control unit transmits, before the main signal, a reception unit activation signal for activating the reception unit, and
an intermittent time length in which the reception unit is intermittently activated is shorter than a time length of the reception unit activation signal.

5. The vehicle keyless system according to claim 1, wherein the state transition processing is processing that the on-vehicle device-side control unit transitions the on-vehicle device-side control unit itself to a sleep state of intermittent activation after the on-vehicle device-side control unit transitions the reception unit into the sleep state.

6. An on-vehicle device configured to control, upon reception of a command signal transmitted from a portable device, an on-vehicle component in response to the command signal as received, wherein
the portable device is configured to transmit the command signal including ID information unique to the portable device as a main signal, and then transmits the command signal including the ID information unique to the portable device as a sub signal subsequent to the main signal,
the on-vehicle device includes:
a reception unit configured to receive the command signal,
an on-vehicle device-side control unit configured to execute command processing of controlling the on-vehicle component based on the command signal as received by the reception unit, and
a storage unit configured to store ID information unique to a portable device to which the on-vehicle device is available,
the sub signal includes a plurality of identical signals intermittently transmitted,
the on-vehicle device-side control unit executes state transition processing of transitioning the on-vehicle device to a power saving state in which processing is not performed on the sub signal transmitted subsequent to the main signal in a case that the command signal transmitted as the main signal is received and the ID information included in the received main signal does not match with the ID information stored in the storage unit, and
in the state transition processing, the reception unit is transitioned to a sleep state in which the reception unit is intermittently activated at a timing that is different from a timing of the sub signal intermittently transmitted and the on-vehicle device is transitioned to a power saving state in which processing is not performed on the sub signal transmitted subsequent to the main signal.

7. The on-vehicle device according to claim 6, wherein the main signal includes a plurality of identical signals that are consecutive with a predetermined time interval therebetween, and the on-vehicle device-side control unit executes the state transition processing when the ID information included in the main signal as received first does not match with the ID information stored in the storage unit.

8. The on-vehicle device according to claim 6, wherein the reception unit outputs, at each reception of the sub signal, an interrupt signal instructing acquisition of the sub signal to the on-vehicle device-side control unit.

9. The on-vehicle device according to claim 6, wherein the portable device transmits, before the main signal, a reception unit activation signal for activating the reception unit, and an intermittent time length in which the reception unit is intermittently activated is shorter than a time length of the reception unit activation signal.

10. The on-vehicle device according to claim 6, wherein the state transition processing is processing that the on-vehicle device-side control unit transitions the on-vehicle device-side control unit itself to a sleep state of intermittent activation after the on-vehicle device-side control unit transitions the reception unit into the sleep state.

11. The vehicle keyless system according to claim 2, wherein the state transition processing is processing that the on-vehicle device-side control unit transitions the on-vehicle device-side control unit itself to a sleep state of intermittent activation after the on-vehicle device-side control unit transitions the reception unit into the sleep state.

12. The vehicle keyless system according to claim 3, wherein the state transition processing is processing that the on-vehicle device-side control unit transitions the on-vehicle device-side control unit itself to a sleep state of intermittent activation after the on-vehicle device-side control unit transitions the reception unit into the sleep state.

13. The vehicle keyless system according to claim 4, wherein the state transition processing is processing that the on-vehicle device-side control unit transitions the on-vehicle device-side control unit itself to a sleep state of intermittent activation after the on-vehicle device-side control unit transitions the reception unit into the sleep state.

14. The on-vehicle device according to claim 7, wherein the state transition processing is processing that the on-vehicle device-side control unit transitions the on-vehicle device-side control unit itself to a sleep state of intermittent activation after the on-vehicle device-side control unit transitions the reception unit into the sleep state.

15. The on-vehicle device according to claim 8, wherein the state transition processing is processing that the on-vehicle device-side control unit transitions the on-vehicle device-side control unit itself to a sleep state of intermittent activation after the on-vehicle device-side control unit transitions the reception unit into the sleep state.

16. The on-vehicle device according to claim 9, wherein the state transition processing is processing that the on-vehicle device-side control unit transitions the on-vehicle device-side control unit itself to a sleep state of intermittent activation after the on-vehicle device-side control unit transitions the reception unit into the sleep state.

* * * * *